US008683969B2

(12) United States Patent
Morita et al.

(10) Patent No.: US 8,683,969 B2
(45) Date of Patent: Apr. 1, 2014

(54) VEHICULAR CONTROL DEVICE

(75) Inventors: Masaki Morita, Toyota (JP); Yuki Miyamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 268 days.

(21) Appl. No.: 13/061,666

(22) PCT Filed: Sep. 8, 2008

(86) PCT No.: PCT/JP2008/066186
§ 371 (c)(1),
(2), (4) Date: Mar. 1, 2011

(87) PCT Pub. No.: WO2010/026662
PCT Pub. Date: Mar. 11, 2010

(65) Prior Publication Data

US 2011/0146945 A1 Jun. 23, 2011

(51) Int. Cl.
*F01P 5/02* (2006.01)
*F01P 7/00* (2006.01)

(52) U.S. Cl.
USPC .............................. 123/142.5 R; 123/196 AB

(58) Field of Classification Search
USPC ............. 123/142.5 R, 196 AB, 41.33, 41.31; 237/2 A, 12.3 R, 12.3 A, 12.36, 12.3 C, 237/12.4; 165/42, 43, 52; 454/159, 143, 454/121; 62/515
See application file for complete search history.

(56) References Cited

U.S. PATENT DOCUMENTS 4,394,960 A * 7/1983 Nakazawa ............... 237/12.3 C
4,925,091 A * 5/1990 Yanagihara et al. .......... 237/2 A
5,586,721 A * 12/1996 Humburg ................. 237/12.3 B
5,593,088 A * 1/1997 Hennrich et al. ........ 237/12.3 C (Continued)

FOREIGN PATENT DOCUMENTS

| | | |
|---|---|---|
| JP | U-04-045111 | 4/1992 |
| JP | U-05-018909 | 3/1993 |
| JP | A-05-124427 | 5/1993 |
| JP | A-10-331678 | 12/1998 |
| JP | A-2000-225837 | 8/2000 |
| JP | A-2001-098941 | 4/2001 |
| JP | A-2006-341660 | 12/2006 |
| WO | WO 2008/078186 | 7/2008 |

OTHER PUBLICATIONS

International Search Report in International Application No. PCT/JP2008/066186; dated Dec. 9, 2008 (with English-language translation).
Nov. 16, 2011 Search Report issued in European patent Application No. 08810241.3.

*Primary Examiner* — Mahmoud Gimie
(74) *Attorney, Agent, or Firm* — Oliff PLC

(57) ABSTRACT

During the time period from the start of an engine to the completion of a catalyst warming-up, the drive of a blower in an air-conditioning equipment is inhibited to suppress the heat-exchange of the air, which is caused to flow in an air duct by the drive of the blower, with cooling water in a heater core disposed in a circulating passage. Therefore, the heat generated in the engine is restrained from being fed to the inside of a compartment through that air after fed to the cooling water. As a result, the temperatures of the engine and the cooling water rise quickly, and the temperature of the exhaust of the engine rises so that the heat is efficiently fed to the catalyst through the exhaust. This means that the heat generated in the engine is preferentially fed through the exhaust to the catalyst that is the portion needing the feed of heat at a low temperature, other than the compartment in the automobile.

6 Claims, 14 Drawing Sheets

(56) References Cited

U.S. PATENT DOCUMENTS

| | | | | |
|---|---|---|---|---|
| 5,657,722 | A * | 8/1997 | Hollis | 123/41.08 |
| 6,079,629 | A * | 6/2000 | Morikawa et al. | 237/12.3 C |
| 6,105,667 | A * | 8/2000 | Yoshinori et al. | 165/202 |
| 6,792,898 | B2 * | 9/2004 | Banzhaf et al. | 123/41.1 |
| 2002/0029771 | A1 * | 3/2002 | Suzuki | 123/551 |
| 2003/0070427 | A1 * | 4/2003 | Banzhaf et al. | 60/320 |
| 2009/0314847 | A1 * | 12/2009 | Nemoto et al. | 237/5 |
| 2010/0242452 | A1 * | 9/2010 | Kawazu et al. | 60/299 |
| 2012/0017637 | A1 * | 1/2012 | Nakajo et al. | 62/515 |

* cited by examiner

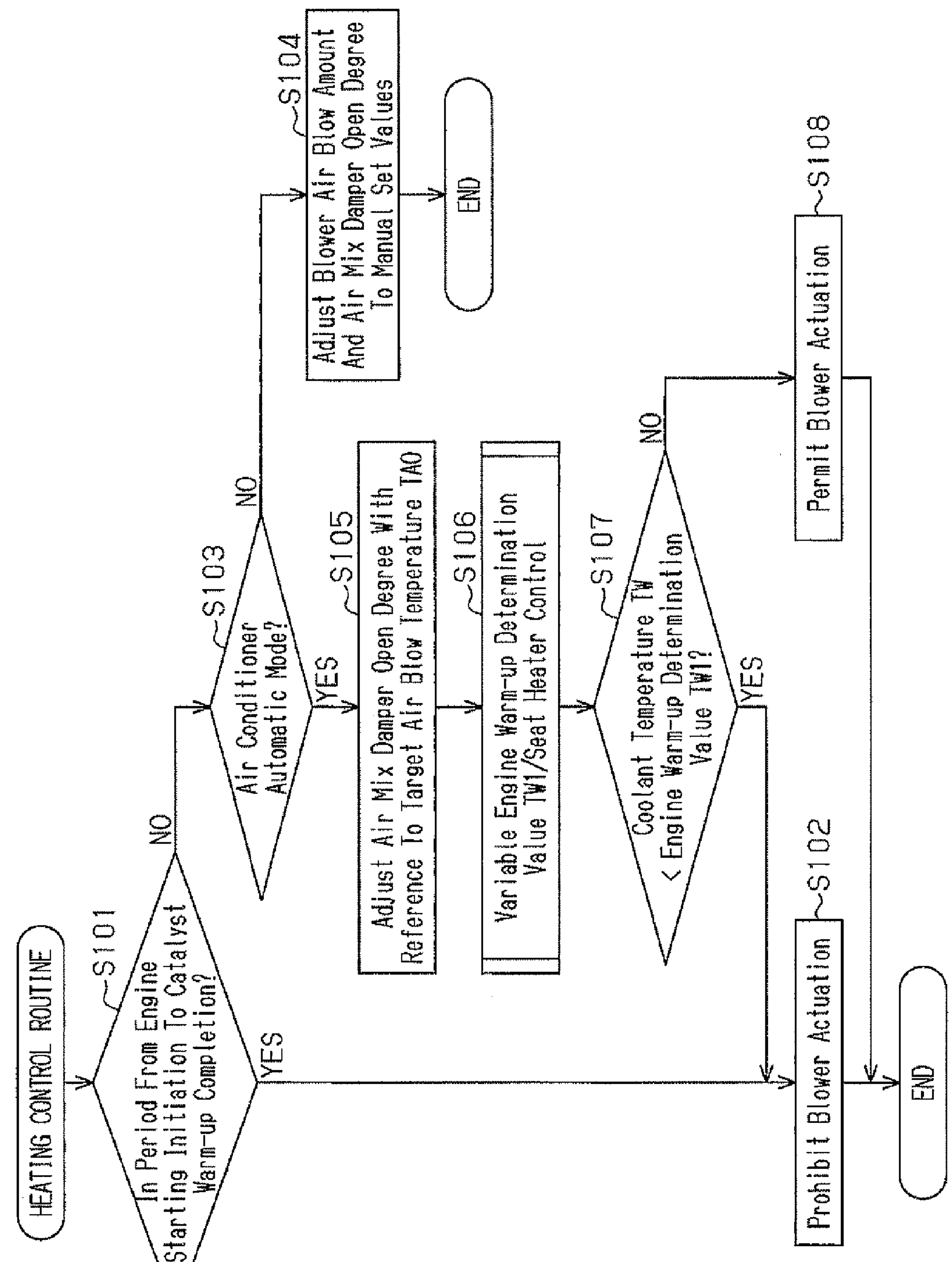
Fig.3
HEATING CONTROL ROUTINE
S101
In Period From Engine Starting Initiation To Catalyst Warm-up Completion?
YES
NO
S103
Air Conditioner Automatic Mode?
YES
NO
S104
Adjust Blower Air Blow Amount And Air Mix Damper Open Degree To Manual Set Values
END
S105
Adjust Air Mix Damper Open Degree With Reference To Target Air Blow Temperature TAO
S106
Variable Engine Warm-up Determination Value TW1/Seat Heater Control
S107
Coolant Temperature TW < Engine Warm-up Determination Value TW1?
YES
NO
S108
Permit Blower Actuation
S102
Prohibit Blower Actuation
END

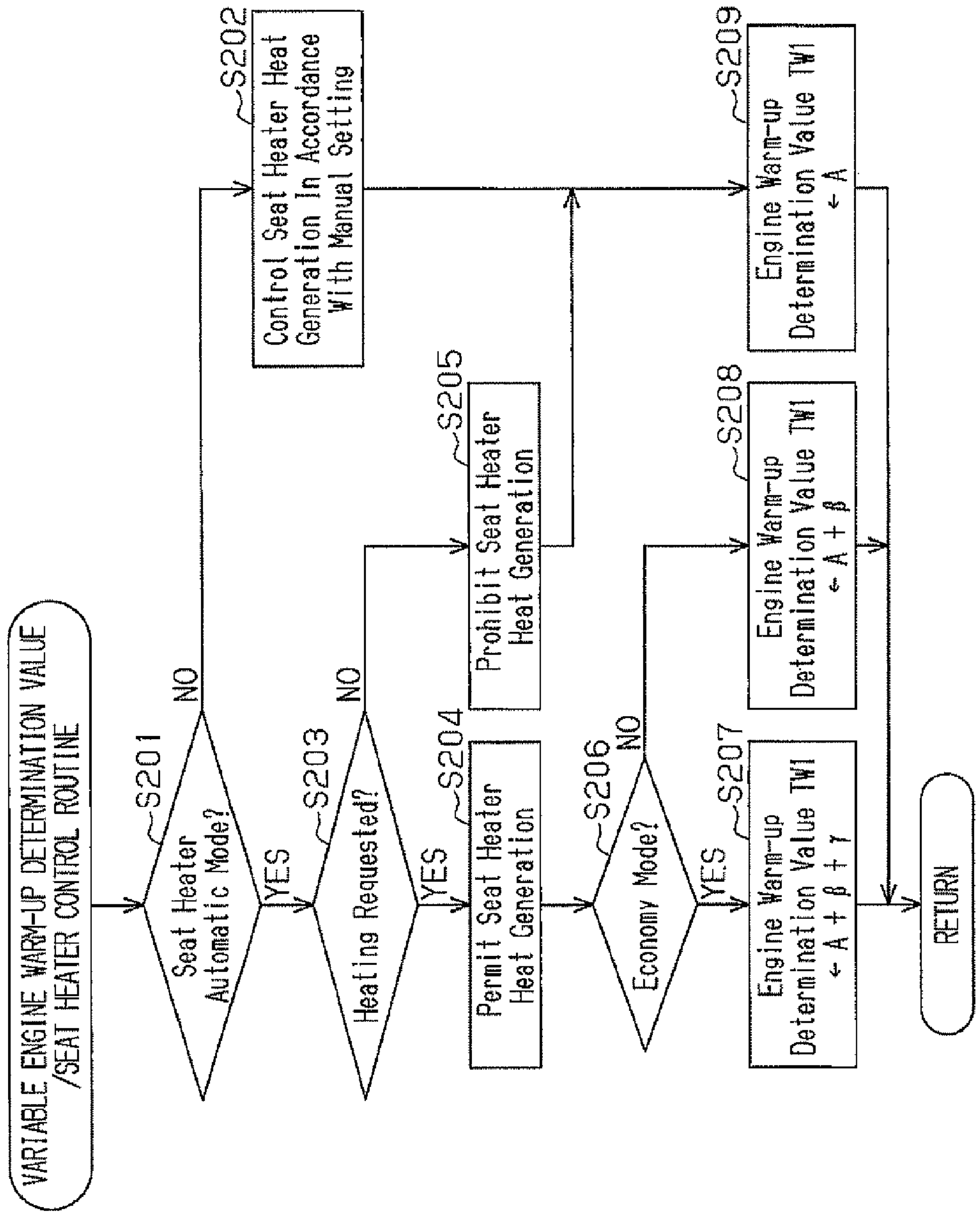
Fig.5
VARIABLE ENGINE WARM-UP DETERMINATION VALUE /SEAT HEATER CONTROL ROUTINE
S201
Seat Heater Automatic Mode?
NO
YES
S202
Control Seat Heater Heat Generation In Accordance With Manual Setting
S203
Heating Requested?
NO
YES
S204
Permit Seat Heater Heat Generation
S205
Prohibit Seat Heater Heat Generation
S206
Economy Mode?
NO
YES
S207
Engine Warm-up Determination Value TW1 ← A + β + γ
S208
Engine Warm-up Determination Value TW1 ← A + β
S209
Engine Warm-up Determination Value TW1 ← A
RETURN (a)
Coolant
Temperature TW
(b)
Blower Air
Blow Amount
0
(c)
Passenger Compartment
Inside Temperature
T1 T2
Time

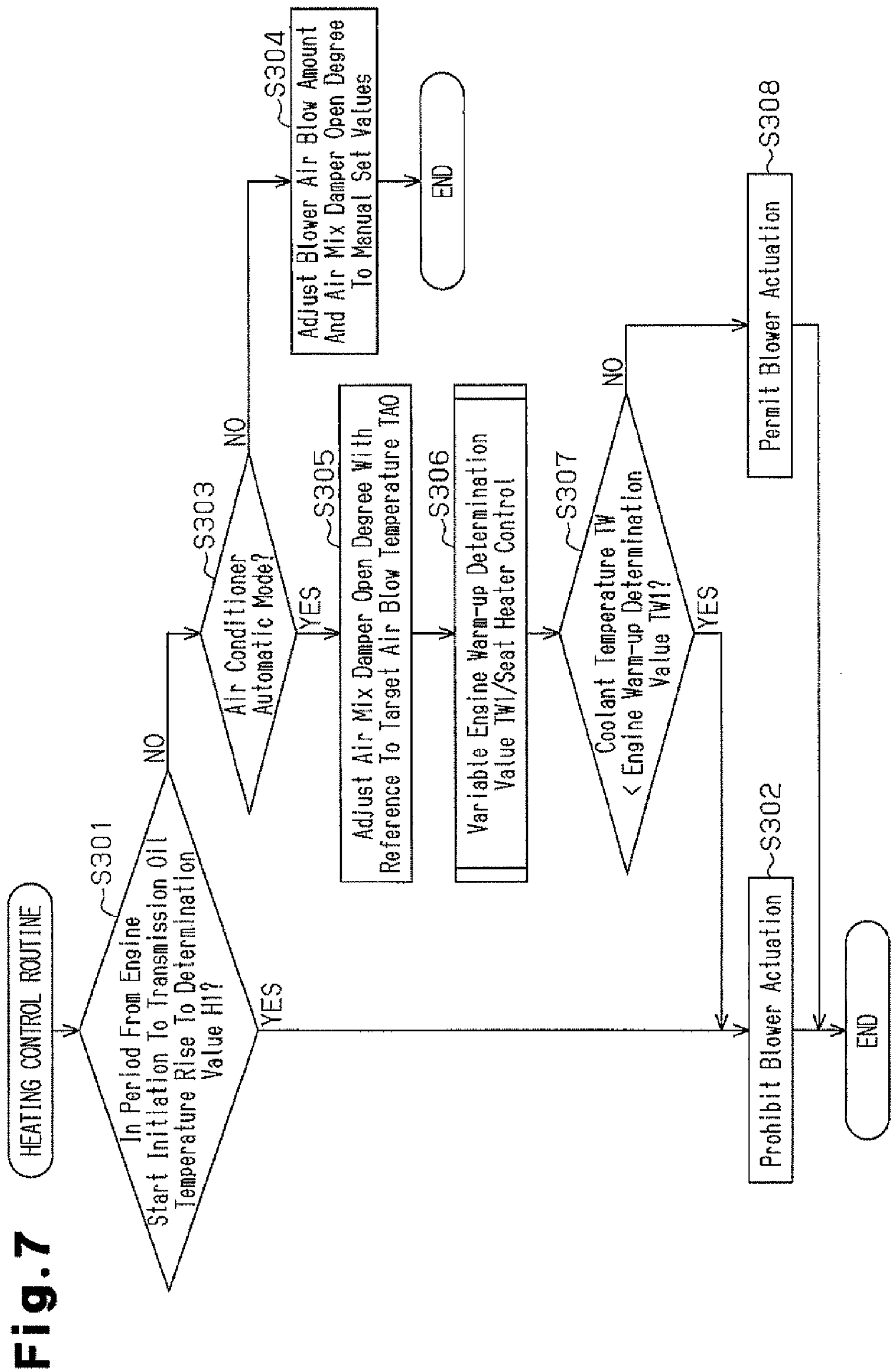
Fig.7
HEATING CONTROL ROUTINE
S301
In Period From Engine Start Initiation To Transmission Oil Temperature Rise To Determination Value H1?
YES
NO
S302
Prohibit Blower Actuation
END
S303
Air Conditioner Automatic Mode?
YES
NO
S304
Adjust Blower Air Blow Amount And Air Mix Damper Open Degree To Manual Set Values
END
S305
Adjust Air Mix Damper Open Degree With Reference To Target Air Blow Temperature TAO
S306
Variable Engine Warm-up Determination Value TW1/Seat Heater Control
S307
Coolant Temperature TW < Engine Warm-up Determination Value TW1?
YES
NO
S308
Permit Blower Actuation

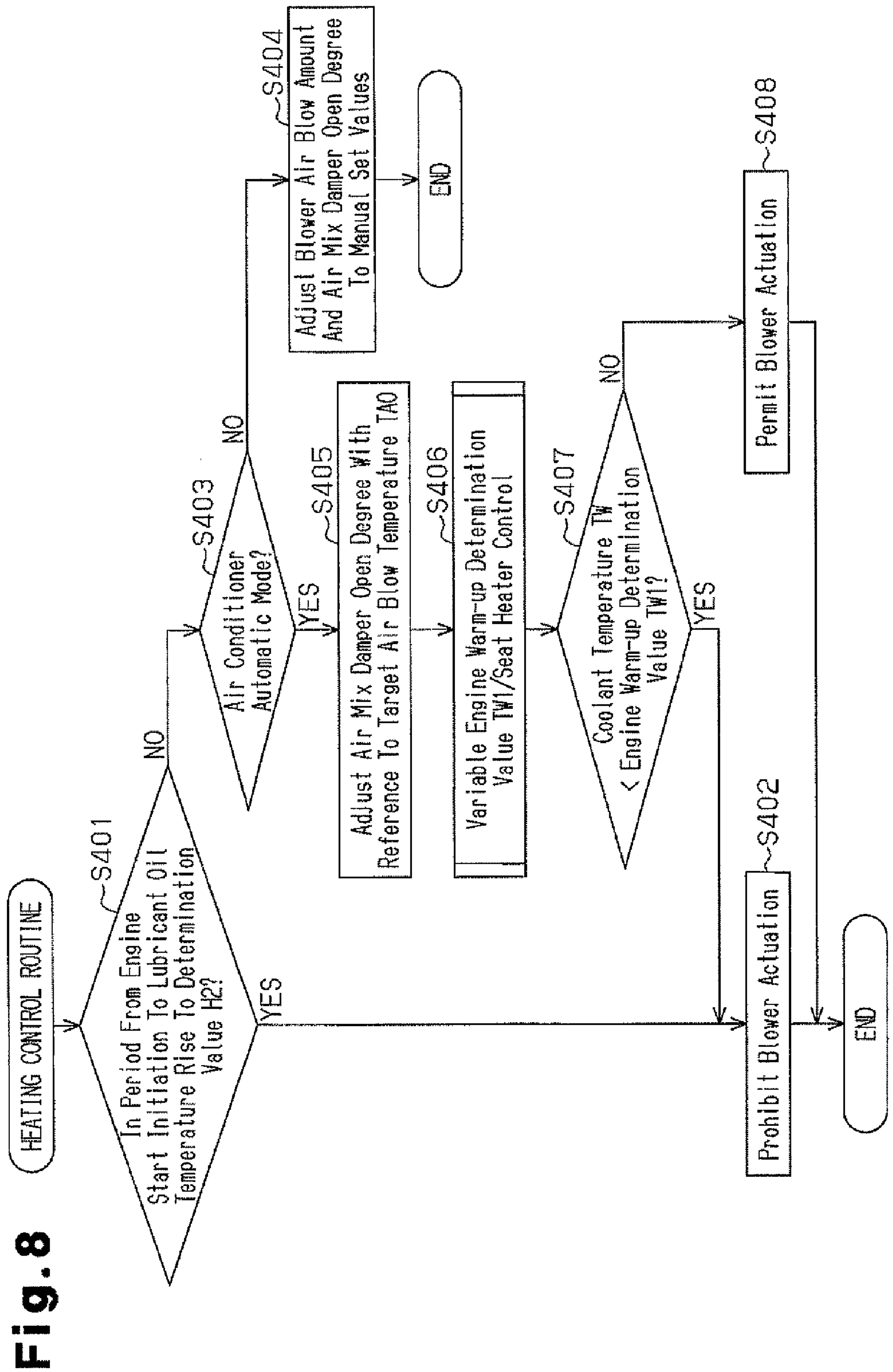
Fig.8
HEATING CONTROL ROUTINE
S401
In Period From Engine Start Initiation To Lubricant Oil Temperature Rise To Determination Value H2?
YES
NO
S402
Prohibit Blower Actuation
END
S403
Air Conditioner Automatic Mode?
YES
NO
S404
Adjust Blower Air Blow Amount And Air Mix Damper Open Degree To Manual Set Values
END
S405
Adjust Air Mix Damper Open Degree With Reference To Target Air Blow Temperature TAO
S406
Variable Engine Warm-up Determination Value TW1/Seat Heater Control
S407
Coolant Temperature TW < Engine Warm-up Determination Value TW1?
YES
NO
S408
Permit Blower Actuation

Fig.9
(a)
Coolant
Temperature TW
Lower Limit
(b)
Engine Speed
(With Temperature Drop
Preventing Control)
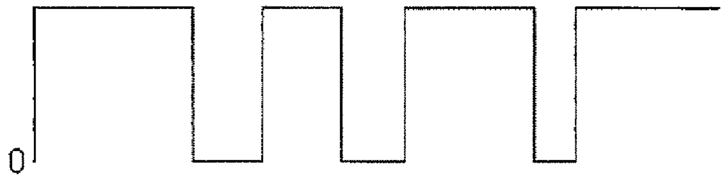
(c)
Engine Speed
(Without Temperature Drop
Preventing Control)
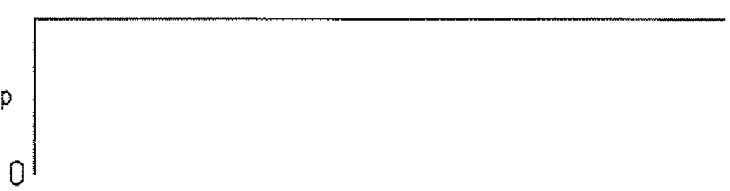
Time

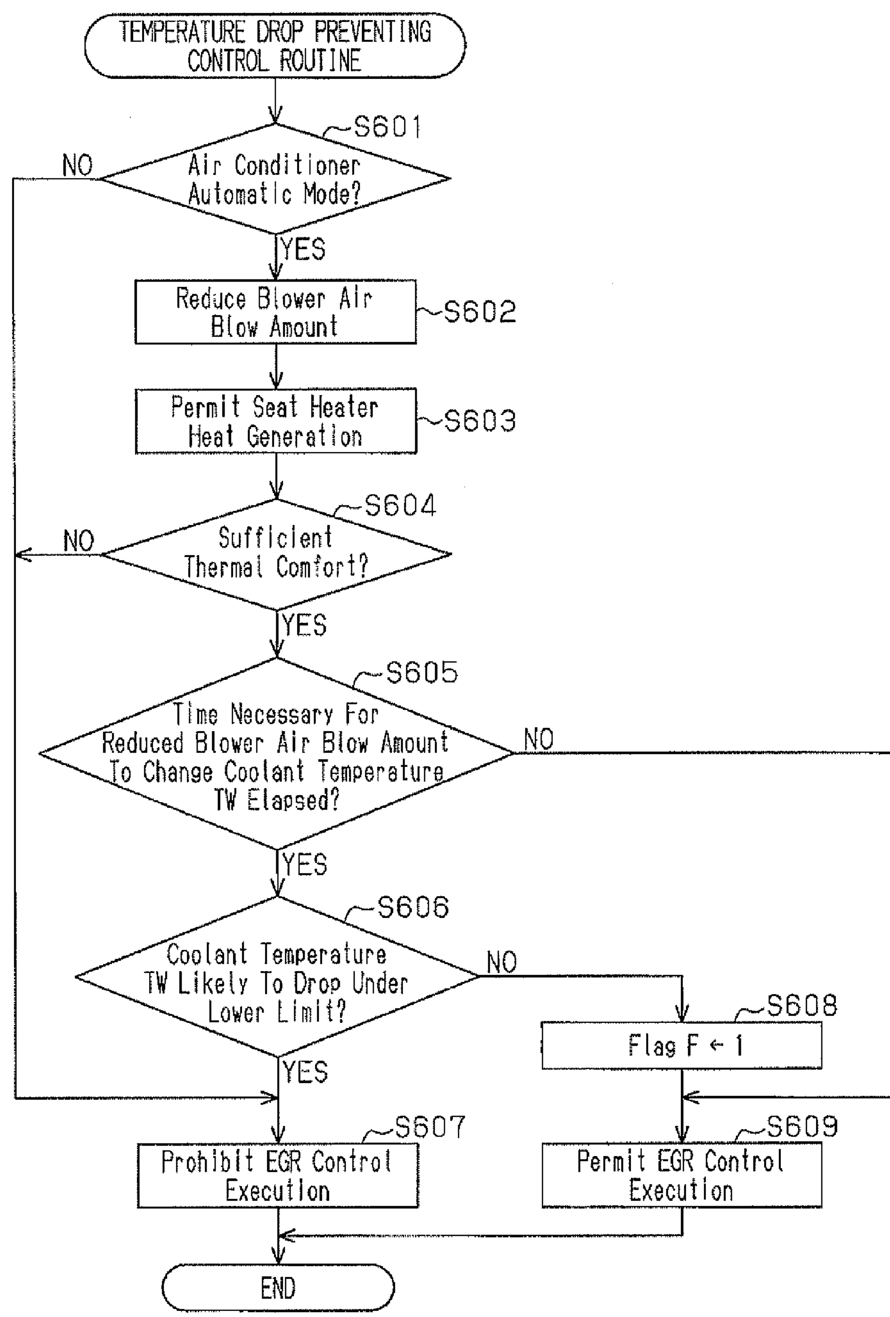
Fig.11
TEMPERATURE DROP PREVENTING CONTROL ROUTINE
S601
Air Conditioner Automatic Mode?
NO
YES
Reduce Blower Air Blow Amount
S602
Permit Seat Heater Heat Generation
S603
S604
Sufficient Thermal Comfort?
NO
YES
S605
Time Necessary For Reduced Blower Air Blow Amount To Change Coolant Temperature TW Elapsed?
NO
YES
S606
Coolant Temperature TW Likely To Drop Under Lower Limit?
NO
S608
Flag F ← 1
YES
S607
Prohibit EGR Control Execution
S609
Permit EGR Control Execution
END

VEHICULAR CONTROL DEVICE

FIELD OF THE INVENTION

The present invention relates to a vehicular control device.

BACKGROUND OF THE INVENTION

Conventionally, a vehicle such as an automobile includes a heat exchanging device for exchanging heat with an internal combustion engine, which is a motor, to cool the engine and an air conditioning device for heating the interior of the passenger compartment using the heat transmitted from the engine to the heat exchanging device.

The heat exchanging device circulates heat exchanging fluid in a circulation path passing through the engine and thus causes heat exchange between the fluid and the engine. When heated to a high temperature, the engine is cooled through such heat exchange between the heat exchanging fluid and the engine. The air conditioning device has a blower driven to discharge warm air into the passenger compartment. When the blower is activated, the air is passed through a heat exchanger on the circulation path in the heat exchanging device. This causes heat exchange between the air and the heat exchanging fluid. The heated air is then sent into the passenger compartment. That is, as the blower is activated in response to a request for heating, a flow of air is generated to pass air through the heat exchanger. The air is thus heated by the heat exchanging fluid and then directed into the passenger compartment, thus heating the interior of the passenger compartment.

When the engine is started from a cold state, the temperature of the heat exchanging fluid in the circulation path of the heat exchanging device is low in the period immediately after the engine starts. Accordingly, even though the blower is activated to direct the air through the heat exchanger in response to the request for heating, the air cannot be effectively heated by the heat exchanging fluid. As a result, even if the air is provided to the passenger compartment after having passed through the heat exchanger, the air cannot heat the interior of the passenger compartment. In this state, occupants may feel cold, and thus the comfort level in the passenger compartment is lowered.

To solve this problem, as disclosed in Patent Document 1, it has been proposed to mount a seat heater heated by a heat source other than the engine, which is, for example, an electrothermal type seat heater that generates heat using electrical power supplied to the seat heater. When the temperature of the heat exchanging fluid in the circulation path is low, the blower of the air conditioning device is not activated even if heating is requested, and the occupants are warmed by means of the seat heater. In this case, even when cold heat exchanging fluid in the circulation path prevents the air conditioning device (the blower) from directing warm air into the passenger compartment, the seat heater warms the occupants and provides heat in the passenger compartment. The comfort level in the passenger compartment is thus prevented from being lowered.

If the temperature of the engine rises and thus the temperature of the heat exchanging fluid in the circulation path, which receives heat from the engine, increases to such a level that the heat exchanging fluid can be used to heat the interior of the passenger compartment, the blower of the air conditioning device is actuated to direct warm air into the passenger compartment, thus heating the interior of the passenger compartment. In contrast, supply of power to the seat heater is stopped. As has been described, by selectively stopping and operating the blower and selectively permitting and prohibiting the power supply to the seat heater, the occupants are warmed in response to a request for heating without unnecessary actuation of the blower or unnecessary heat generation by the seat heater.

Recent vehicles exhibit improved engine thermal efficiency, which is brought about by reducing the size of the engine and ensuring automatic stopping and re-starting of the engine. In other words, heat generated by an engine is decreased. Accordingly, additional components of the vehicle must be heated when at a cold temperature, aside from the passenger compartment.

For example, a catalyst is mounted in the exhaust system of an engine mounted in a vehicle to purify exhaust gas. To ensure maximum catalyst performance for purification of the exhaust gas, the catalyst must be completely warmed up by raising the catalyst bed temperature, which is the temperature of the catalyst, to an activation level at which the catalyst is activated. However, the above-described vehicles in which the engine generates less heat tend to have a low temperature for engine exhaust gas. As a result, at certain outside air temperatures and in certain operating states of the engine, it may be impossible to raise the catalyst bed temperature to a value greater than or equal to the activation level, or, in other words, to complete warm-up of the catalyst.

Also, the transmission is connected to the output shaft of the engine of the vehicle. Rotation of the engine is thus transmitted to wheels of the vehicle through the transmission. The transmission uses transmission oil. When the temperature of the transmission oil reaches a level that is high to a certain extent (which is, for example, the temperature t1) with respect to normal temperature at the time when the engine is not running, the transmission is allowed to achieve such an operating state that the fuel consumption of the engine decreases. Accordingly, to reduce the fuel consumption, it is contemplated to cause heat exchange between the heat exchanging fluid in the circulation path in the heat exchanging device, which is mounted in the vehicle, and the transmission oil, thus maintaining the temperature of the transmission oil at a level higher than or equal to the temperature t1. However, in the above-described vehicles in which the engine generates less heat, the heat exchanging fluid, which is heated through heat exchange with the engine, tends to exhibit a low temperature. As a result, at certain outside air temperatures and in certain engine operating states, it may be impossible to increase the temperature of the transmission oil to a value greater than or equal to the temperature t1.

Additionally, the engine mounted in a vehicle uses lubricant oil. When the temperature of the lubricant oil reaches a value that is high to a certain extent (which is, for example, the temperature t2) with respect to a normal temperature at the time when the engine is not running, the viscosity of the lubricant oil decreases and the resistance of the lubricant oil against rotation of the engine reduces. The lubricant oil thus achieves such a state that is effective to decrease the fuel consumption. Accordingly, to reduce the fuel consumption, it is contemplated to cause heat exchange between the heat exchanging fluid in the circulation path in the heat exchanging device, which is mounted in the vehicle, and the lubricant oil, thus maintaining the temperature of the lubricant oil at a level higher than or equal to the temperature t2. However, in the above-described vehicles in which the engine generates less heat, the heat exchanging fluid, which is heated through heat exchange with the engine, tends to exhibit a low temperature. As a result, at certain outside air temperatures and in certain engine operating states, it may be impossible to increase the temperature of the lubricant oil to a value greater than or equal to the temperature t2.

That is, in the above-described vehicles, the catalyst mounted in the exhaust system of the engine, the transmission oil used in the transmission, and the lubricant oil used in the engine correspond to the components aside from the passenger compartment that must be heated when at a cold temperature.

If the technique of Patent Document 1 is used in these vehicles, the heat produced by the engine is distributed preferentially to the passenger compartment but not to the components of the vehicle aside from the passenger compartment that must be heated when at a cold temperature. Specifically, when heating is requested and the heat generated by the engine increases the temperature of the heat exchanging fluid to such a high level that the heat exchanging fluid may be used to heat the passenger compartment, the blower of the air conditioning device is actuated to discharge the air heated by the engine as a heat source into the passenger compartment. In other words, the heat produced by the engine is distributed preferentially to the passenger compartment by means of the heat exchanging fluid and the air. This makes it difficult to provide the heat generated by the engine to the components aside from the passenger compartment that must be heated when at a cold temperature, which are the catalyst, the transmission oil, and the lubricant oil.

If the heat of the engine is not distributed preferentially to the components aside from the passenger compartment that must be heated when at a cold temperature, including the catalyst, the transmission oil, and the lubricant oil, the temperatures of these components decrease, thus preventing the engine from reducing fuel consumption and improving exhaust emission.

Patent Document 1

Japanese Laid-Open Utility Model Publication No. 5-18909 (paragraphs [0032] to [0036])

SUMMARY OF THE INVENTION

Accordingly, it is an objective of the present invention to provide a vehicular control device that supplies heat generated by an internal combustion engine preferentially to components of the vehicle aside from the passenger compartment that need to be heated when at a cold temperature.

To achieve the foregoing objective, a vehicular control device according to the present invention includes a catalyst, a heat exchanging device, and an air conditioning device. The catalyst is arranged in an exhaust system of an internal combustion engine mounted in a vehicle and purifies exhaust gas. The heat exchanging device includes a circulation path passing through the engine, and circulates heat exchanging fluid in the circulation path to cause heat exchange between the heat exchanging fluid and the engine. The air conditioning device has a heat exchanger on the circulation path and a blower actuated to generate a flow of air passing by the heat exchanger in response to a request for heating. The air conditioning device directs air into a passenger compartment after the air is warmed through heat exchange with the heat exchanging fluid at the heat exchanger. The control device further includes prohibiting means for prohibiting actuation of the blower in a period from when starting of the engine is initiated to when the catalyst is warmed up completely.

In the above-described configuration, the blower is prohibited from being actuated in a period from starting of the engine to completion of warm-up of the catalyst, even if heating is requested. When actuation of the blower is prohibited, air is prevented from flowing through the actuation of the blower and being subjected to heat exchange with the heat exchanging fluid at the heat exchanger on the circulation path. Accordingly, after the heat produced by the engine is supplied to the heat exchanging fluid, the heat is prevented from being sent into the passenger compartment by means of the aforementioned air. This rapidly raises the temperature of the engine and the temperature of the heat exchanging fluid, thus increasing exhaust temperature of the engine. The heat is thus efficiently supplied to the catalyst by means of exhaust gas from the engine. In other words, the heat generated by the engine is distributed preferentially to the catalyst, which is a component of the vehicle that must be heated when at a low temperature, aside from the passenger compartment. As a result, after starting of the engine is initiated, the catalyst bed temperature quickly rises to the activation level and the catalyst is completely warmed up. This prevents retardation in increase of the catalyst bed temperature to the activation level, or, in other words, retardation in completion of the warm-up of the catalyst, after initiation of starting of the engine. The engine is thus prevented from being retarded in improving the exhaust emission by the amount corresponding to such retardation.

In accordance with one aspect of the present invention, the vehicle has heat generating means for generating heat to heat the interior of the passenger compartment through a heat source other than the engine. The prohibiting means: continuously prohibits the actuation of the blower if, after completion of warm-up of the catalyst, the temperature of the heat exchanging fluid is less than an engine warm-up completion temperature at which it is determined that the engine is completely warmed up; causes the heat generating means to generate heat if a request for heating is generated while the actuation of the blower is prohibited; and permits the actuation of the blower on condition that the warm-up of the catalyst is completed and the temperature of the heat exchanging fluid is greater than or equal to the engine warm-up completion temperature.

In the above-described configuration, the heat produced by the engine is distributed preferentially to the catalyst and the heat exchanging fluid when the blower is prohibited from being actuated in the air conditioning device. This completes warm-up of the catalyst and the engine at an early stage after initiation of starting of the engine. The exhaust emission of the engine is thus improved. If a request for heating is generated when actuation of the blower is prohibited, the interior of the passenger compartment is heated by the heat generated by the heat generating means. This prevents the comfort level in the passenger compartment from being lowered. That is, occupants in the passenger compartment do not feel cold when the actuation of the blower is prohibited. When the catalyst is completely warmed up and it is determined that the temperature of the heat exchanging fluid is greater than or equal to the engine warm-up completion temperature, or, in other words, preferential supply of the heat of the engine to the catalyst and the heat exchanging fluid is stopped and the heat of the heat exchanging fluid can be used to heat the interior of the passenger compartment, actuation of the blower is permitted. This directs warm air into the passenger compartment to heat the interior of the passenger compartment. In this manner, exhaust emission of the engine is improved and comfort level in the passenger compartment is prevented from being lowered.

In accordance with another aspect of the present invention, when the blower is actuated to direct heated air into the passenger compartment in response to a request for heating, temperature raising control for raising the temperature of the heat exchanging fluid by operating the engine to increase the amount of the heat generated by the engine is performed on condition that the temperature of the heat exchanging fluid drops to a value less than a lower limit of the temperatures that allow the air to heat the interior of the passenger compartment. The control device further includes control means. When it is determined that the temperature of the heat exchanging fluid is so low that the temperature of the heat exchanging fluid is likely to decrease to a value less than the lower limit through the actuation of the blower in response to a request for heating after the catalyst is completely warmed up, the control means performs temperature drop preventing control to prevent a temperature drop in the heat exchanging fluid.

When an engine generates a small amount of heat, it is likely that the temperature of the heat exchanging fluid drops to a value less than the lower limit of the temperatures that allow air, which is directed into the passenger compartment through the actuation of the blower of the air conditioning device after completion of the catalyst warm-up, to heat the interior of the passenger compartment, when the air is heated through heat exchange with the heat exchanging fluid at the heat exchanger. In this case, the temperature raising control is carried out to increase the amount of heat produced by the engine. The temperature of the heat exchanging fluid is thus returned to a value greater than or equal to the aforementioned lower limit through the temperature raising control. However, when the engine generates an increased amount of heat in accordance with the temperature raising control, the engine consumes an increased amount of fuel, which is disadvantageous in reduction of the fuel consumed by the engine. Accordingly, to decrease the fuel consumption of the engine, it is preferable to maximally avoid execution of the temperature raising control.

In the above-described configuration, the temperature drop preventing control is performed to prevent a temperature drop in the heat exchanging fluid when it is determined that the temperature of the heat exchanging fluid is so low that the temperature of the heat exchanging fluid is likely to decrease to a value less than the aforementioned lower limit through the actuation of the blower in response to a request for heating. This prevents the temperature of the heat exchanging fluid from being lowered to a value less than the lower limit, thus preventing the temperature raising control from being carried out due to decreased temperature of the heat exchanging fluid. As a result, reduction of the fuel consumption of the engine is maximally prevented from being hampered by the execution of the temperature raising control.

The present invention also provides a vehicular control device including a transmission connected to an output shaft of an internal combustion engine mounted in a vehicle, a heat exchanger, and an air conditioning device. The heat exchanging device has a circulation path passing through the engine, and causes heat exchange between heat exchanging fluid and the engine and between the heat exchanging fluid and transmission oil of the transmission by circulating the heat exchanging fluid in the circulation path. The air conditioning device has a heat exchanger on the circulation path and a blower that is actuated to produce a flow of air passing by the heat exchanger in response to a request for heating. The air conditioning device directs air into a passenger compartment after the air is warmed through the heat exchange with the heat exchanging fluid at the heat exchanger. The control device further includes prohibiting means for prohibiting actuation of the blower in a period from when starting of the engine is initiated to when the temperature of the transmission oil increases to a determination value at which the transmission can be operated in an operating state that contributes to reduction in fuel consumption of the engine.

In the above-described configuration, the actuation of the blower is prohibited in a period from when the engine is started to when the temperature of the transmission oil rises to the aforementioned determination value, even if heating is requested. When the blower is prohibited from being actuated, the air is prevented from flowing through the actuation of the blower and exchanging heat with the heat exchanging fluid at the heat exchanger. This prevents the heat generated by the engine from being directed into the passenger compartment by means of the air after the heat is transmitted to the heat exchanging fluid. The temperature of the engine and the temperature of the heat exchanging fluid thus rapidly increase, thus ensuring efficient heat transmission from the heat exchanging fluid to the transmission oil, which exchanges heat with the heat exchanging fluid. In other words, the heat produced by the engine is distributed preferentially to the transmission oil, which is a component of the vehicle that must be heated when at a low temperature, aside from the passenger compartment. Accordingly, after starting of the engine is initiated, the temperature of the transmission oil quickly rises to the determination value, thus allowing the transmission to operate in an operating state that contributes to reduction of the fuel consumption of the engine. This prevents retardation in increase of the temperature of the transmission oil to the determination value, or, in other words, achievement of the aforementioned operating state by the transmission, after initiation of starting of the engine. As a result, the reduction of the fuel consumption of the engine is prevented from being hampered by the amount corresponding to such retardation.

In accordance with one aspect of the present invention, the transmission includes a transmission mechanism, a torque converter for transmitting power between the transmission mechanism and the engine by means of oil, and a lock-up clutch capable of connecting the transmission mechanism and the engine directly to each other. The determination value is a lock-up control permitting temperature at which execution of lock-up control is permitted, the lock-up control being executed to cause the lock-up clutch to connect the transmission mechanism and the engine to each other.

After starting of the engine is initiated, execution of the lock-up control is permitted on condition that the temperature of the transmission oil increases to the determination value, which is the lock-up clutch control permitting temperature. This causes the lock-up clutch to connect the transmission mechanism and the engine to each other through the lock-up control, thus ensuring efficient transmission of rotation from the engine to the transmission mechanism. The fuel consumption of the engine is thus reduced when the engine is operated to allow the vehicle to travel. Accordingly, when the execution of the lock-up control is permitted, it is indicated that the transmission is operated in the operating state that contributes to the reduction of the fuel consumption of the engine.

In the above-described configuration, the heat generated by the engine is distributed preferentially to the transmission oil after starting of the engine is initiated. This rapidly increases the temperature of the transmission oil to the lock-up control permitting temperature. Permission of the execution of the lock-up control is thus prevented from being retarded. As a result, reduction of fuel consumption of the engine is prevented from being hampered by the amount corresponding to such retardation.

In accordance with another aspect of the present invention, the determination value is a neutral control permitting temperature for permitting execution of neutral control by which the transmission mechanism is switched to a neutral state when no request for autonomous traveling of the vehicle is generated.

After starting of the engine is initiated, execution of the neutral control is permitted on condition that the temperature of the transmission oil increases to the determination value, which is the neutral control permitting temperature. This switches the transmission mechanism of the transmission to a neutral state through the neutral control, thus decreasing resistance of the transmission to rotation of the engine. The fuel consumed by the engine is thus reduced by the amount corresponding to the decreased resistance. Accordingly, when the execution of the neutral control is permitted, it is indicated that the transmission is operated in the operating state that contributes to the reduction of the fuel consumption of the engine.

In the above-described configuration, the heat generated by the engine is distributed preferentially to the transmission oil after starting of the engine is initiated. This rapidly increases the temperature of the transmission oil to the neutral control permitting temperature. Permission of the execution of the neutral control is thus prevented from being retarded. As a result, the reduction of the fuel consumption of the engine is prevented from being hampered by the amount corresponding to such retardation.

In accordance with one aspect of the present invention, the vehicle includes heat generating means for generating heat to heat the interior of the passenger compartment through a heat source other than the engine. The prohibiting means: continuously prohibits the actuation of the blower if, after the temperature of the transmission oil increases to the determination value, the temperature of the heat exchanging fluid is less than an engine warm-up completion temperature at which it is determined that the engine is completely warmed up; causes the heat generating means to generate heat if a request for heating is generated while the actuation of the blower is prohibited; and permits the actuation of the blower on condition that the temperature of the transmission oil increases to the determination value and the temperature of the heat exchanging fluid is greater than or equal to the engine warm-up completion temperature.

In the above-described configuration, when actuation of the blower in the air conditioning device is prohibited, the heat generated by the engine is distributed preferentially to the transmission oil and the heat exchanging fluid. In this manner, the temperature of the transmission oil increases to the aforementioned determination value at an early stage after initiation of engine starting, thus allowing the transmission to operate in the operating state that contributes to the reduced consumption of the fuel by the engine and completing warm-up of the engine. As a result, the fuel consumption of the engine is reduced at the early stage after initiation of starting of the engine. If heating is requested when the actuation of the blower is prohibited, the heat generating means is caused to generate heat to heat the interior of the passenger compartment. This prevents occupants in the passenger compartment from feeling cold while the actuation of the blower is prohibited. That is, the comfort level in the passenger compartment is not lowered. When the temperature of the transmission oil meets the determination value and the temperature of the heat exchanging fluid becomes greater than or equal to the engine warm-up completion temperature, preferential distribution of the heat produced by the engine to the transmission oil and the heat exchanging fluid is terminated so that the heat of the heat exchanging fluid can be used to heat the interior of the passenger compartment. The actuation of the blower is thus permitted to be actuated and discharges warm air into the passenger compartment to heat the interior of the passenger compartment. As a result, fuel consumption of the engine is reduced and the comfort level in the passenger compartment is prevented from being lowered.

In accordance with one aspect of the present invention, when the blower is actuated to direct heated air into the passenger compartment in response to a request for heating, temperature raising control for raising the temperature of the heat exchanging fluid by operating the engine to increase the amount of the heat generated by the engine is performed on condition that the temperature of the heat exchanging fluid drops to a value less than a lower limit of the temperatures that allow the air to heat the interior of the passenger compartment. The control device further includes control means. When it is determined that the temperature of the heat exchanging fluid is so low that the temperature of the heat exchanging fluid is likely to decrease to a value less than the lower limit through the actuation of the blower in response to a request for heating after the temperature of the transmission oil increases to the determination value, the control means performs temperature drop preventing control to prevent a temperature drop in the heat exchanging fluid.

When an engine generates a small amount of heat, it is likely that the temperature of the heat exchanging fluid drops to a value less than the lower limit of the temperatures that allow the air, which is sent into the passenger compartment through the actuation of the blower of the air conditioning device after the temperature of the transmission oil reaches the aforementioned determination value, to heat the interior of the passenger compartment, when the air is heated through heat exchange with the heat exchanging fluid at the heat exchanger in the circulation path. In this case, the temperature raising control is carried out to increase the amount of the heat produced by the engine. The temperature of the heat exchanging fluid is thus returned to a value greater than or equal to the aforementioned lower limit through the temperature raising control. However, when the engine generates an increased amount of heat in accordance with the temperature raising control, the engine consumes an increased amount of fuel, which is disadvantageous in reduction of the fuel consumed by the engine. Accordingly, to decrease the fuel consumption of the engine, it is preferable to maximally avoid execution of the temperature raising control.

In the above-described configuration, the temperature drop preventing control is performed to prevent a temperature drop in the heat exchanging fluid when it is determined that the temperature of the heat exchanging fluid is so low that the temperature of the heat exchanging fluid is likely to decrease to a value less than the aforementioned lower limit through the actuation of the blower in response to a request for heating. This prevents the temperature of the heat exchanging fluid from being lowered to a value less than the lower limit, thus preventing the temperature raising control from being carried out due to a decreased temperature of the heat exchanging fluid. As a result, reduction of the fuel consumption of the engine is maximally prevented from being hampered by the execution of the temperature raising control.

The present invention further provides a vehicular control device including a heat exchanger and an air conditioning device. The heat exchanging device has a circulation path passing through an internal combustion engine, and causes heat exchange between heat exchanging fluid and the engine and between the heat exchanging fluid and lubricant oil of the engine by circulating the heat exchanging fluid in the circulation path. The air conditioning device has a heat exchanger on the circulation path and a blower that is actuated to produce a flow of air passing by the heat exchanger in response to a request for heating. The air conditioning device directs air into a passenger compartment after the air is warmed through the heat exchange with the heat exchanging fluid at the heat exchanger. The control device includes prohibiting means for prohibiting actuation of the blower in a period from when starting of the engine is initiated to when the temperature of the lubricant oil of the engine increases to a determination value at which the engine is efficiently operated.

In the above-described configuration, the actuation of the blower is prohibited in a period from when the engine is started to when the temperature of the lubricant oil rises to the aforementioned determination value, even if heating is requested. When the blower is prohibited from being actuated, the air is prevented from flowing through the actuation of the blower and exchanging heat with the heat exchanging fluid at the heat exchanger in the circulation path. This prevents the heat generated by the engine from being sent into the passenger compartment by means of the air after the heat is transmitted to the heat exchanging fluid. The temperature of the engine and the temperature of the heat exchanging fluid thus rapidly increase, thus ensuring efficient heat transmission from the heat exchanging fluid to the lubricant oil, which exchanges heat with the heat exchanging fluid. In other words, the heat produced by the engine is distributed preferentially to the lubricant oil, which is a component of the vehicle that must be heated when at a low temperature, aside from the passenger compartment. Accordingly, after starting of the engine is initiated, the temperature of the lubricant oil quickly rises to the determination value, thus enabling the engine to operate efficiently. Specifically, as the temperature of the lubricant oil rises, the viscosity of the lubricant oil decreases. This reduces the resistance of the lubricant oil to rotation of the engine, thus allowing the engine to operate efficiently. Accordingly, after starting of the engine is initiated, increase of the temperature of the lubricant oil to the determination value is prevented from being retarded. In other words, the engine is enabled, without a delay, to operate efficiently. As a result, the reduction of the fuel consumption of the engine is prevented from being hampered by the amount corresponding to such retardation.

In accordance with one aspect of the present invention, the vehicle includes heat generating means for generating heat to heat the interior of the passenger compartment through a heat source other than the engine. The prohibiting means: continuously prohibits the actuation of the blower if, after the temperature of the lubricant oil increases to the determination value, the temperature of the heat exchanging fluid is less than an engine warm-up completion temperature at which it is determined that the engine is completely warmed up; causes the heat generating means to generate heat if a request for heating is generated while the actuation of the blower is prohibited; and permits the actuation of the blower on condition that the temperature of the lubricant oil increases to the determination value and the temperature of the heat exchanging fluid is greater than or equal to the engine warm-up completion temperature.

In the above-described configuration, when the actuation of the blower in the air conditioning device is prohibited, the heat generated by the engine is distributed preferentially to the lubricant oil and the heat exchanging fluid. In this manner, the temperature of the lubricant oil increases to the aforementioned determination value at an early stage after initiation of engine starting. This enables the engine to operate efficiently, or, specifically, reduces the resistance of the lubricant oil to rotation of the engine by lowering the viscosity of the lubricant oil, and completes the warm-up of the engine. As a result, fuel consumption of the engine is reduced at an early stage after initiation of starting of the engine. If heating is requested when the actuation of the blower is prohibited, the heat generating means is caused to generate heat to heat the interior of the passenger compartment. This prevents the occupants in the passenger compartment from feeling cold while the actuation of the blower is prohibited. That is, the comfort level in the passenger compartment is not lowered. When the temperature of the lubricant oil meets the determination value and the temperature of the heat exchanging fluid becomes greater than or equal to the engine warm-up completion temperature, preferential distribution of the heat produced by the engine to the lubricant oil and the heat exchanging fluid is stopped so that the heat of the heat exchanging fluid can be used to heat the interior of the passenger compartment. The blower is thus permitted to be actuated and discharges warm air into the passenger compartment to heat the interior of the passenger compartment. As a result, the fuel consumption of the engine is reduced and the comfort level in the passenger compartment is prevented from being lowered.

In accordance with one aspect of the present invention, when the blower is actuated to direct heated air into the passenger compartment in response to a request for heating, temperature raising control for raising the temperature of the heat exchanging fluid by operating the engine to increase the amount of the heat generated by the engine is performed on condition that the temperature of the heat exchanging fluid drops to a value less than a lower limit of the temperatures that allow the air to heat the interior of the passenger compartment. The control device further includes control means. When it is determined that the temperature of the heat exchanging fluid is so low that the temperature of the heat exchanging fluid is likely to decrease to a value less than the lower limit through the actuation of the blower in response to a request for heating after the temperature of the lubricant oil increases to the determination value, the control means performs temperature drop preventing control to prevent a temperature drop in the heat exchanging fluid.

When an engine generates a small amount of heat, it is likely that the temperature of the heat exchanging fluid drops to a value less than the lower limit of the temperatures that allow the air, which is sent into the passenger compartment through the actuation of the blower of the air conditioning device after the temperature of the lubricant oil of the engine reaches the aforementioned determination value, to heat the interior of the passenger compartment, when the air is heated through heat exchange with the heat exchanging fluid at the heat exchanger. In this case, the temperature raising control is carried out to increase the amount of heat produced by the engine. The temperature of the heat exchanging fluid is thus returned to a value greater than or equal to the aforementioned lower limit through the temperature raising control. However, when the engine generates an increased amount of heat in accordance with the temperature raising control, the engine consumes an increased amount of fuel, which is disadvantageous in reduction of the fuel consumed by the engine. Accordingly, to decrease the fuel consumption of the engine, it is preferable to maximally avoid execution of the temperature raising control.

In the above-described configuration, the temperature drop preventing control is performed to prevent a temperature drop in the heat exchanging fluid when it is determined that the temperature of the heat exchanging fluid is so low that the temperature of the heat exchanging fluid is likely to decrease to a value less than the aforementioned lower limit through the actuation of the blower in response to a request for heating. This prevents the temperature of the heat exchanging fluid from being lowered to a value less than the lower limit, thus preventing the temperature raising control from being carried out due to a decreased temperature of the heat exchanging fluid. As a result, reduction of the fuel consumption of the engine is maximally prevented from being hampered by the execution of the temperature raising control.

In accordance with one aspect of the present invention, the vehicle includes heat generating means for generating heat to heat the interior of the passenger compartment through a heat source other than the engine. The control means reduces an air blow amount of the blower in the temperature drop preventing control, and causes the heat generating means to generate heat when the air blow amount of the blower is decreased.

In the above-described configuration, by decreasing the air blow amount of the blower of the air conditioning device in accordance with the temperature drop preventing control, the amount of air directed into the passenger compartment via the heat exchanger in the circulation path is reduced. This reduces the heat of the heat exchanging fluid from being transmitted to the air in the heat exchanger, thus preventing a temperature drop in the heat exchanging fluid. Specifically, as the heat transmitted from the heat exchanging fluid to the air that passes by the heat exchanger decreases, the temperature of the air sent into the passenger compartment is inevitably lowered. This may cause occupants to feel cold. That is, the comfort level in the passenger compartment may be lowered. However, when the blower air blow amount is reduced in accordance with the temperature drop preventing control, the heat generating means is caused to generate heat to heat the interior of the passenger compartment. The occupants are prevented from feeling cold. That is, the comfort level in the passenger compartment is not lowered.

In accordance with one aspect of the present invention, the engine is capable of carrying out EGR control for returning some of exhaust gas passing through an exhaust system to an intake system through an EGR mechanism. The control means prohibits execution of the EGR control in addition to reduction of the air blow amount of the blower in the temperature drop preventing control. The execution of the EGR control is prohibited on condition that decrease of the temperature of the fluid exchanging fluid to a value less than the lower limit cannot be prevented simply by reducing the air blow amount of the blower, and is permitted if the decrease of the temperature of the heat exchanging fluid to a value less than the lower limit is prevented simply by decreasing the air blow amount of the blower.

By returning some of the exhaust gas of the engine to the intake system through the EGR control, pumping loss and cooling loss of the engine are reduced. This decreases the fuel consumed by the engine. However, when the cooling loss of the engine decreases through the EGR control, the engine generates a decreased amount of heat, thus lowering the temperature of the heat exchanging fluid. Accordingly, if the blower is actuated when the EGR control is carried out, likeliness that the temperature of the heat exchanging fluid drops to a value less than the aforementioned lower limit increases. If the temperature of the heat exchanging fluid decreases to a value less than the lower limit and the temperature raising control is performed as the EGR control is executed, the engine consumes an increased amount of fuel. As a result, despite the fact that execution of the EGR control is intended to reduce the fuel consumed by the engine, the fuel consumption of the engine is increased.

In the above-described configuration, the air blow amount of the blower of the air conditioning device is reduced in accordance with the temperature drop control. Then, on condition that the temperature of the heat exchanging fluid cannot be prevented from dropping to a value less than the lower limit simply by reducing the air blow amount of the blower, execution of the EGR control is prohibited. This reliably prevents decrease of the temperature of the heat exchanging fluid to a value less than the lower limit. The fuel consumption of the engine is thus further reliably prevented from being increased by execution of the temperature raising control. In contrast, when the temperature of the heat exchanging fluid is prevented from decreasing to a value less than the lower limit simply through reduction of the air blow amount of the blower, the execution of the EGR control is permitted. As a result, the execution of the EGR control is maximally permitted, thus maximizing the effect of reducing the fuel consumption of the engine through the EGR control.

In accordance with one aspect of the present invention, the control means permits the execution of the EGR control when the decrease of the temperature of the heat exchanging fluid to a value less than the lower limit is prevented simply by reducing the air blow amount of the blower. When the reduction of the air blow amount of the blower is performed with the EGR control permitted, the control means suspends the reduction of the air blow amount of the blower to restore the air blow amount to an original value and stops heat generation by the heat generating means if the temperature of the heat exchanging fluid rises to such a value that the temperature of the heat exchanging fluid is prevented from dropping to a value less than the lower limit even after suspension of the reduction of the air blow amount of the blower and restoration of the air blow amount to the original value.

In the above-described configuration, when the air blow amount of the blower is reduced with execution of the EGR control permitted and the temperature of the heat exchanging fluid rises to such a value that the temperature of the heat exchanging fluid is unlikely to drop to a value less than the lower limit even if reduction of the air blow amount of the blower is suspended and the air blow amount is restored to the original amount, the reduction of the air blow amount of the blower is suspended to restore the original air blow amount and heat generation by the heat generating means is stopped. This prevents the reduction of the air blow amount of the blower and the heat generation by the heat generating means from continuing for an unnecessarily long time.

In accordance with one aspect of the present invention, the air conditioning device sets a target air blow temperature, which is a target value for the temperature of the air sent into the passenger compartment through the actuation of the blower based on an outside air temperature, an actual inside temperature in the passenger compartment, and a set temperature for the passenger compartment set by an occupant. The air conditioning device varies a heat exchange amount between the air and the heat exchanging fluid at the heat exchanger based on the target air blow temperature. The prohibiting means determines that a request for heating is generated when the target air blow temperature is greater than or equal to a predetermined heating request determination value and causes the heat generating means to generate heat, the prohibiting means determining that the request for heating is not generated if the target air blow temperature is less than the heating request determination value and suspending heat generation by the heat generating means.

In the above-described configuration, it is appropriately determined whether a request for heating is generated. This prevents the heat generating means, the heat generation of which is selectively permitted and prohibited depending on whether the request for heating is generated, from generating heat unnecessarily or failing to generate heat when necessary.

In accordance with one aspect of the present invention, the prohibiting means determines that the temperature of the heat exchanging fluid is greater than or equal to the engine warm-up completion temperature and permits the actuation of the blower on condition that the temperature of the heat exchanging fluid is greater than or equal to an engine warm-up determination value. The engine warm-up determination value is set to a higher value when the heat generating means is caused to generate heat on condition that it is determined that the request for heating is generated than when the heat generation by the heat generating means is suspended on condition that it is determined that the request for heating is not generated.

In the above-described configuration, when it is determined that a request for heating is generated and thus the heat generating means is caused to generate heat, actuation of the blower is permitted from a prohibited state only after the temperature of the heat exchanging fluid increases to a high value after initiation of engine starting, compared with when negative determination is made as to whether the request for heating is generated and the heat generating means is prevented from generating heat. In other words, after starting of the engine is initiated, the heat generated by the engine is distributed further preferentially to the heat exchanging fluid over the passenger compartment. This further rapidly raises the temperature of the heat exchanging fluid after the initiation of starting of the engine, thus further quickly completing warm-up of the engine. Specifically, even though the heat produced by the engine is distributed further preferentially to the heat exchanging fluid over the passenger compartment, as has been described, the heat generating means is caused to generate heat to heat the interior of the passenger compartment. This prevents the occupants from feeling cold. That is, the comfort level in the passenger compartment is not lowered.

In accordance with one aspect of the present invention, the air conditioning device is switchable between a normal mode and an economy mode through switch manipulation by an occupant of the vehicle. The engine warm-up determination value is set variably depending on the switch manipulation between the normal mode and the economy mode, the engine warm-up determination value being set to a higher value when the economy mode is selected than when the normal mode is selected.

In the above-described configuration, when the economy mode is selected by the occupant, actuation of the blower is permitted from a prohibited state only after the temperature of the heat exchanging fluid increases to a high value after initiation of engine starting, compared with when the normal mode is selected. In other words, after starting of the engine is initiated, the heat generated by the engine is distributed further preferentially to the heat exchanging fluid over the passenger compartment. This further rapidly raises the temperature of the heat exchanging fluid after the initiation of starting of the engine, thus further quickly completing warm-up of the engine.

BRIEF DESCRIPTION OF THE DRAWINGS

FIG. 3 is a flowchart representing a heating control procedure of the first embodiment;

FIG. 5 is a flowchart representing steps of a variable engine warm-up determination value/seat heater control procedure;

FIG. 7 is a flowchart representing steps of heating control according to a second embodiment;

FIG. 8 is a flowchart representing steps of heating control according to a third embodiment;

FIG. 9 is a timing chart representing differences between a case with temperature drop preventing control and a case without the temperature drop preventing control in terms of changes of the coolant temperature and the engine speed;

FIG. 11 is a flowchart representing steps for performing the temperature drop preventing control;

DETAILED DESCRIPTION OF THE PREFERRED EMBODIMENTS

First Embodiment

A first embodiment of the present invention, which is a control device for an automobile, will now be described with reference to FIGS. 1 to 6.

Figure 1:
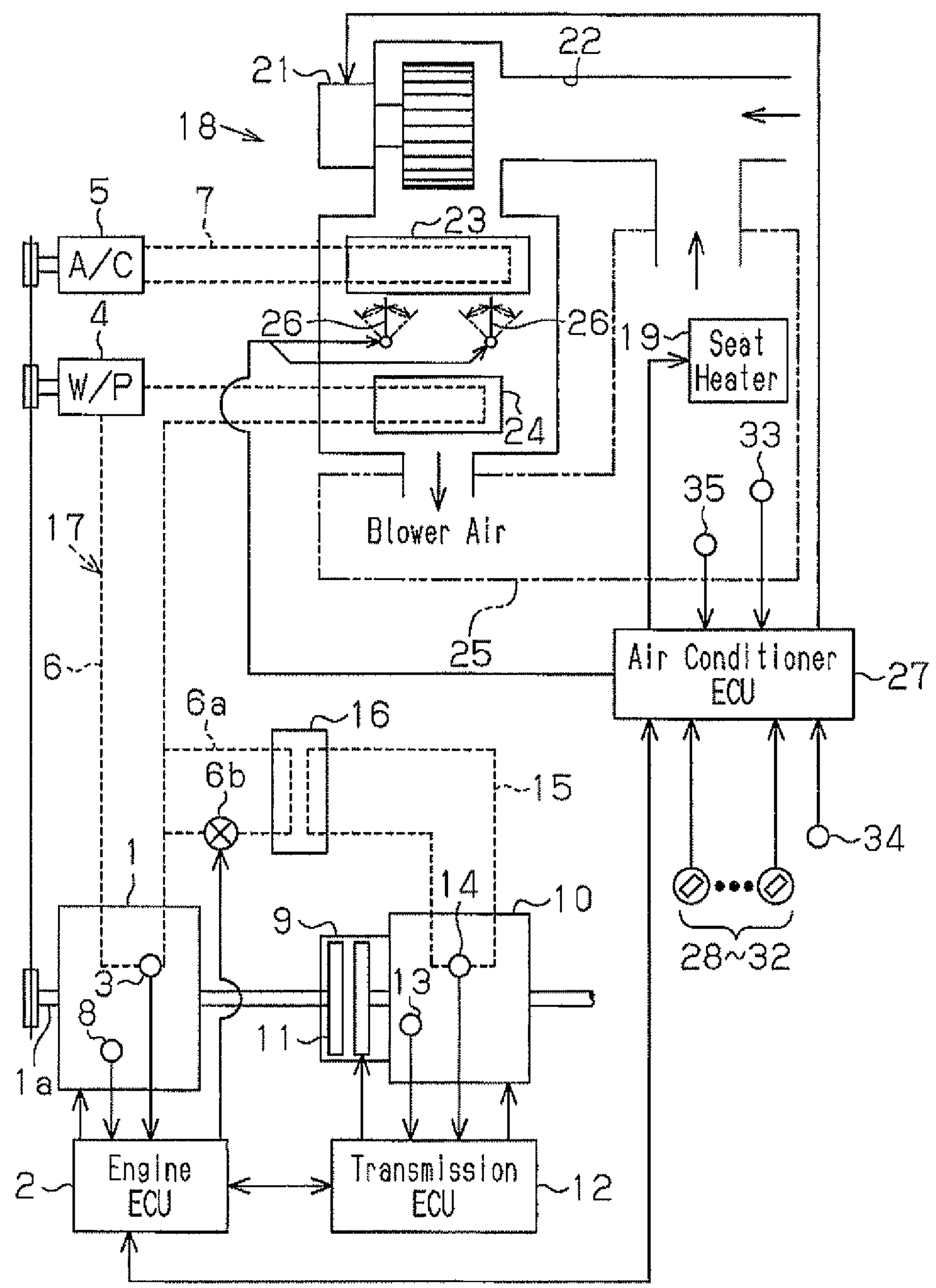
FIG. 1 is a diagram schematically representing the configuration of an automobile according to a first embodiment.

In an automobile, as represented in FIG. 1, a transmission 10 is connected to an output shaft 1*a* of an engine 1, which is mounted as a motor. The automobile runs as rotational force from the engine 1 (via the output shaft 1*a*) is transmitted to wheels through the transmission 10. The transmission 10 has a torque converter 9 and a lockup clutch 11. The torque converter 9 transmits the drive force from the engine 1 to a transmission mechanism, which is provided in the transmission 10, through oil. The lockup clutch 11 is capable of connecting the engine 1 and the transmission mechanism directly to each other. The lockup clutch 11 and the transmission mechanism of the transmission 10 are operated using hydraulic pressure produced by transmission oil, which is hydraulic fluid in the transmission 10.

The automobile also includes a heat exchanging device 17, which exchanges heat with the engine 1 to cool the engine 1. The heat exchanging device 17 circulates coolant as heat exchanging fluid in a circulation path 6, which passes through the engine 1, by actuating a water pump 4, thus causing heat exchange between the coolant and the engine 1. Through such heat exchange, the engine 1 is cooled when heated to a high temperature. The water pump 4 of the heat exchanging device is driven by rotational force transmitted from the output shaft 1*a* of the engine 1.

The heat exchanging device 17 causes heat exchange not only between the coolant and the engine 1, but also between the coolant and the transmission oil in the transmission 10.

Specifically, a branch line 6*a* branched from the circulation path 6 in the heat exchanging device passes through an oil cooler 16, through which an oil passage 15 passes. The transmission oil circulates in the oil passage 15. The oil cooler 16 causes the heat exchange between the coolant and the transmission oil. Completing the heat exchange, the coolant returns to the circulation path 6 after passing through the branch line 6*a*. That is, when the temperature of the transmission oil is higher than the temperature of the coolant, the coolant cools the oil. When the temperature of the transmission oil is lower than the temperature of the coolant, the coolant warms the oil. A flow control valve 6$b$, which selectively opens and closes in such a manner as to adjust the amount of the coolant flowing through the oil cooler 16, is provided in the branch line 6$a$. By regulating the open degree of the flow control valve 6$b$, the amount of the heat exchanged between the coolant and the transmission oil is adjusted.

The automobile has an electronic control device (an engine ECU) 2 for controlling operation of the engine 1 and actuation of the flow control valve 6$b$. The automobile further includes an electronic control device (a transmission ECU) 12 for the transmission, which controls operation of the lockup clutch 11 and operation of the transmission mechanism of the transmission 10. The engine ECU 2 receives detection signals from a coolant temperature sensor 3 for detecting the coolant temperature TW of the engine 1, which is, more specifically, the temperature of the coolant in the circulation path 6, an oil temperature sensor 8 for detecting the temperature of lubricant oil in the engine 1, and other various types of sensors. The transmission ECU 12 receives detection signals from various types of sensors including a turbine rotation number sensor 13 for detecting a rotation number input from the engine 1 (the output shaft 1$a$) to the transmission 10 and an oil temperature sensor 14 for detecting the temperature of the transmission oil. The engine ECU 2 and the transmission ECU 12 are connected to each other and capable of communicating with each other.

An air conditioning device 18, which heats the interior of a passenger compartment 25 of the automobile using the heat transmitted from the engine 1 to the heat exchanging device 17, will hereafter be described.

The air conditioning device 18 includes a blower 21, which is driven to discharge warm air or cold air into the passenger compartment 25. As the blower 21 is actuated to generate a flow of air, the air is introduced into an air duct 22. The air is then passed through an evaporator 23 and a heater core 24 before reaching the interior of the passenger compartment 25.

A refrigerant passage 7 for circulating an air conditioning refrigerant passes through the evaporator 23. The air in the air duct 22 is cooled by the refrigerant flowing in the refrigerant passage 7. The refrigerant in the refrigerant passage 7 is circulated and cooled in the refrigerant passage 7 through operation of an air conditioning compressor 5, which is actuated through power transmission from the output shaft 1$a$ when the engine 1 operates. The circulation path 6 of the above-described heat exchanging device 17 extends through the heater core 24, which is a heat exchanger. The air in the air duct 22 is heated by the warm coolant in the circulation path 6.

Air mix dampers 26, which are used for adjusting the temperature of the air passing through the air duct 22, are arranged between the evaporator 23 and the heater core 24 in the air duct 22. The open/close position of each of the air mix dampers 26 is changed in order to adjust the proportion of the air to be passed through the heater core 24 to the air that has passed through the evaporator 23, which is, in other words, the amount of heat exchanged between the coolant and the air in the heater core 24. For example, when the air mix dampers 26 are switched to such an open/close position (corresponding to a minimum open degree) that the air is prevented from passing by the heater core 24, the air that has been cooled by passing by the evaporator 23 is supplied directly into the passenger compartment 25. Accordingly, the temperature of the air sent from the air duct 22 into the passenger compartment 25 is decreased to a lowermost level. As the air mix dampers 26 are switched to such positions (corresponding to increasing open degrees) that the amount of the air to be passed through the heater core 24 increases, the temperature of the air sent from the air duct 22 into the passenger compartment 25 rises.

This raises the temperature of the air sent from the air duct 22 into the passenger compartment 25. In this state, as long as the interior of the passenger compartment 25 is heated by this air, heating of the passenger compartment 25 is performed using the heat transmitted from the engine 1 to the coolant in the heat exchanging device 17.

The air conditioning device 18 includes a seat heater that is arranged in a seat in the passenger compartment 25 and generates heat using an additional heat source other than the engine 1, which is, for example, an electrothermal type of seat heater 19 that generates heat when supplied with electric power. The seat heater 19 is used in, for example, a period immediately after the engine 1 is started from a cold state when the temperature of the coolant (the coolant temperature TW) in the circulation path 6 of the heat exchanging device 17 is low. Specifically, in this period, even if the blower 21 is actuated to pass air through the heater core 24 to heat the interior of the passenger compartment 25, the air cannot be effectively heated by the heater core 24. By using the seat heater 19 as a heating means (a heating portion), occupants may be warmed by the seat heater 19 even when the low coolant temperature TW prevents supply of warm air into the passenger compartment 25, despite of the fact that the blower 21 is activated. As a result, occupants are prevented from feeling cold. That is, the comfort level in the passenger compartment 25 is not lowered.

The blower 21, the air mix dampers 26, and the seat heater 19 of the air conditioning device are driven and controlled through the electronic control device (the air conditioner ECU) 27 for the air conditioning device, which is mounted in the automobile. The air conditioner ECU 27 and the engine ECU 2 are connected to each other and capable of communicating with each other. The air conditioning ECU 27 functions as prohibiting means and control means (a prohibiting section and a control section). The air conditioner ECU 27 receives detection signals from various types of sensors such as an insolation amount sensor 33 for detecting the amount of insolation in the passenger compartment 25, an outside air temperature sensor 34 for detecting the temperature (the outside air temperature) of the air in the exterior of the automobile, and an inside temperature sensor 35 for detecting the temperature (the inside temperature) of the air in the passenger compartment 25. The air conditioner ECU 27 receives signals also from the various types of switches described below:

An air conditioner automatic control switch 28 for switching between an air conditioner automatic mode corresponding to automatic regulation of the temperature in the passenger compartment 25 and a manual mode corresponding to manual adjustment of the temperature in the passenger compartment 25;

A temperature setting switch 29 for switching the set temperature in the passenger compartment 25;

An air blow amount setting switch 30 for setting the air blow amount of the blower 21;

A seat heater automatic control switch 31 for switching between a seat heater automatic mode corresponding to automatic regulation of heat generation by the seat heater and a manual mode corresponding to manual adjustment of the seat heater heat generation; and A mode switch 32 for switching between an economy mode corresponding to regulation of the temperature in the passenger compartment 25 in which a reduction in fuel consumption is a priority and a normal mode corresponding to such regulation in which the comfort level is a priority.

When the air conditioner automatic control switch 28 is at the "MANUAL" operation position, the air conditioner ECU 27 controls the blower 21 and the air mix dampers 26 based on the operational positions of the temperature setting switch 29 and the air blow amount setting switch 30, which are manipulated by an occupant of the automobile, in order to regulate the temperature in the passenger compartment 25 in accordance with the air conditioner manual mode. In other words, the open/close position of each air mix damper 26 is adjusted in such a manner that the temperature of the air directed from the air duct 22 into the passenger compartment 25 becomes a value corresponding to the operational position of the temperature setting switch 29. Also, the rotational speed of the blower 21 is adjusted in such a manner that the air blow amount of the blower 21 meets a set air blow amount commanded by the operational position of the air blow amount setting switch 30.

In contrast, when the air conditioner automatic control switch 28 is at the operational position "AUTO", the air conditioner ECU 27 calculates a target air blow temperature TAO in accordance with the set temperature set by the operational position of the temperature setting switch 29, the inside temperature, the insulation amount, the outside air temperature, and the coolant temperature TW, to perform regulation of the temperature in the passenger compartment 25 in accordance with the air conditioner automatic mode. The target air blow temperature TAS is a target value for the temperature of the air discharged from the air duct 22 into the passenger compartment 25 for maintaining the temperature in the passenger compartment 25 at the aforementioned set temperature. The open/close position of each air mix damper 26 is adjusted in such a manner that the temperature of the air sent from the air duct 22 into the passenger compartment 25 achieves the aforementioned target air blow temperature TAO. Also, operation of the blower 21 is controlled according to the target air blow temperature TAO in such a manner as to optimize the blower air blow amount.

When the mode switch 32 is at the "NORMAL" position, the air conditioner ECU 27 employs, for example, a value normally calculated as the target air blow temperature TAO to perform the regulation of the temperature in the passenger compartment 25 in which the comfort level in the passenger compartment 25 is a priority. If the mode switch is at the "ECONOMY" position, the air conditioner ECU 27 sets, for example, the target air blow temperature TAO to a value more approximate to the outside air temperature than the normally calculated value to perform the regulation of the temperature in the passenger compartment 25 in which the reduction in fuel consumption is a priority.

When the seat heater automatic control switch 31 is at the "AUTO" operational position, the air conditioner ECU 27 selectively permits and prohibits the power supply to the seat heater 19 with reference to the operational position of the temperature setting switch 29 and the inside temperature detected by the inside temperature sensor 35 or the target air blow temperature TAO, so as to perform selective power supply to the seat heater 19 in accordance with the seat heater automatic mode. When supplied with the power, the seat heater 19 generates heat. Without the power supply, the seat heater 19 suspends the heat generation. If the seat heater automatic control switch 31 is at the "ON" position or "OFF" position, the air conditioner ECU 27 selectively permits and prohibits the power supply to the seat heater 19 in accordance with the seat heater manual mode. Specifically, if the seat heater automatic control switch 31 is at the "ON" position, the power is supplied to the seat heater 19 to cause the seat heater 19 to produce heat. If the seat heater automatic control switch 31 is at "OFF" position, the power supply to the seat heater 19 is suspended to stop the heat generation by the seat heater 19.

Figure 2:
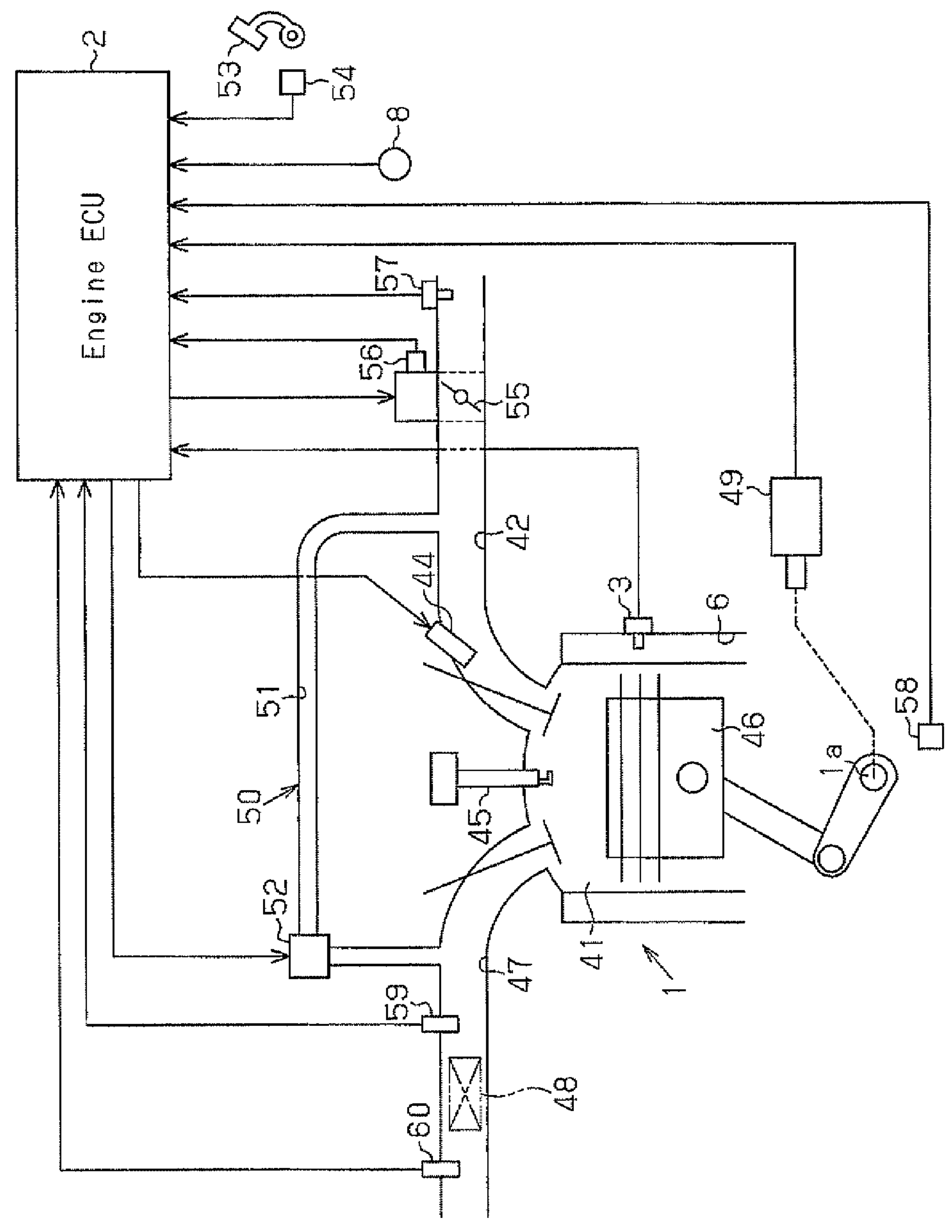
FIG. 2 is a diagram representing an engine mounted in the automobile represented in FIG. 1.
Figure 4:
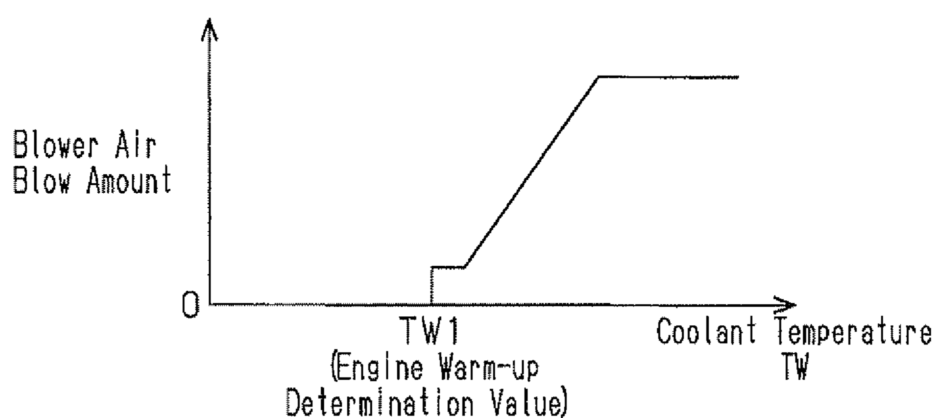
FIG. 4 is a graph representing the relationship between the coolant temperature and the blower air blow amount in an air conditioner automatic mode.

The configuration of the engine 1 and various control procedures related to the engine 1 will hereafter be described with reference to FIG. 2.

In the engine 1, fuel is injected from a fuel injection valve 44 and fed to a combustion chamber 41 via an intake passage 42, together with air. As the air-fuel mixture, which is mixture of air and fuel, is ignited by a spark plug 45 in the combustion chamber 41, the air-fuel mixture burns to reciprocate a piston 46, thus rotating the output shaft 1*a* of the engine 1. After having been burnt in the combustion chamber 41, the air-fuel mixture is sent from the combustion chamber 41 to an exhaust passage 47 as exhaust gas. The gas is then purified by a catalytic converter 48 arranged in the exhaust passage 47. The catalytic converter 48 carries a catalyst for purifying the exhaust gas. The exhaust gas is purified with maximum effectiveness when the catalyst is completely warmed up by raising the catalyst bed temperature, which is the temperature of the catalyst, to the activation level at which the catalyst is activated.

A starter 49, which forcibly rotates (cranks) the engine 1 to cause autonomous engine operation when the engine 1 is started from a stopped state, is connected to the output shaft 1*a* of the engine 1. By performing fuel injection by the fuel injection valve 44 and ignition by the spark plug 45 when the engine 1 cranks, autonomous operation of the engine 1 is brought about and the engine 1 is thus completely started. To decrease the fuel consumption, the engine 1 carries out automatic stopping and restarting. Specifically, the engine 1 is automatically stopped on condition that a prescribed automatic stopping condition is satisfied. If the automatic stopping condition becomes non-satisfied when the engine 1 is in an automatically stopped state, the engine 1 is automatically restarted.

The engine 1 also includes an EGR mechanism 50, which returns some exhaust gas from the exhaust passage 47 to the intake passage 42 for the purpose of decreasing the amount of nitrogen oxides (NOx) contained in the exhaust gas. The EGR mechanism 50 has an EGR passage 51 extending between the exhaust passage 47 and the intake passage 42 and an EGR valve 52, which has an open degree regulated to vary the gas flow area of the EGR passage 51, thus adjusting the amount of the exhaust gas returned from the exhaust passage 47 to the intake passage 42. Since the EGR mechanism 50 returns some of the exhaust gas of the engine 1 to the intake passage 42, the combustion chamber 41 retains the gas (the exhaust gas) that does not contribute to combustion of the air-fuel mixture that occurs in the combustion chamber 41. This lowers the combustion temperature of the air-fuel mixture in the combustion chamber 41 and thus reduces generation of NOx. As a result, the amount of NOx contained in the exhaust gas of the engine 1 decreases.

The aforementioned engine ECU 2, which controls the operation of the engine 1, receives detection signals from the aforementioned coolant temperature sensor 3 for detecting the temperature of the coolant in the circulation path 6, the oil temperature sensor 8 for detecting the temperature of the lubricant oil in the engine 1, and, additionally, the sensors described below:

An accelerator position sensor 54 for detecting the depression amount (the accelerator depression amount) of an accelerator pedal 53, which is depressed by the driver of the automobile;

A throttle position sensor 56 for detecting the open degree (the throttle open degree) of a throttle valve 55 located in the intake passage 42;

An airflow meter 57 for detecting the amount of air drawn into the combustion chamber 41 via the intake passage 42;

A crank position sensor 58 that outputs a signal corresponding to rotation of the output shaft 1*a* and is used to calculate the engine speed;

An air-fuel ratio sensor 59 that outputs a signal corresponding to the oxygen concentration in the exhaust gas; and An exhaust temperature sensor 60 for detecting the temperature of the exhaust gas in the exhaust passage 47 at a position downstream from the catalytic converter 48.

The engine ECU 2 determines the engine operating state with reference to the detection signals provided by the above-described sensors and, according to the engine operating state, outputs command signals to driver circuits for driving various types of devices including the throttle valve 55, the fuel injection valve 44, the starter 49, and the EGR valve 52. In this manner, various types of control such as fuel injection amount control, throttle open degree control, EGR control, and automatic stopping and restarting control are carried out through the engine ECU 2.

Problems after initiation of starting of the engine 1 of the above-described automobile will hereafter be described with reference to FIGS. 1 and 2.

In a period immediately after cold starting of the engine 1, the coolant in the circulation path 6 of the heat exchanging device 17 is maintained at a low temperature. Accordingly, even if the blower 21 of the air conditioning device 18 is activated to pass air through the heater core 24 on the circulation path 6 in response to a request for heating, the air cannot be heated by the coolant. As a result, even if the air is sent into the passenger compartment 25 after passing by the heater core 24, the air cannot heat the interior of the passenger compartment 25. This may cause occupants to feel cold. That is, the comfort level in the passenger compartment 25 is lowered. The aforementioned request for heating is generated if the target air blow temperature TAO is high when in the air conditioner automatic mode. In the air conditioner manual mode, the request for heating is generated when the set temperature set through the temperature setting switch 29 is high.

The above-described problem about heating in the period immediately after cold starting of the engine 1 is solved by the seat heater 19. Specifically, when an occupant feels cold, the occupant may switch the seat heater automatic control switch 31 to "ON". Alternatively, the occupant may switch the seat heater automatic control switch 31 to "AUTO" and manipulate the temperature setting switch 29 to raise the set temperature. These operations cause the power supply to the seat heater 19 and the seat heater 19 to generate heat to warm the occupant and heat the interior of the passenger compartment 25. As a result, the comfort level in the passenger compartment 25 is prevented from being lowered, preventing the occupant from feeling cold in the above-described circumstance.

When the air conditioner automatic mode and the seat heater automatic mode are selected and the temperature of the engine 1 rises to increase the temperature of the coolant (the coolant temperature TW) in the circulation path 6, which exchanges heat with the engine 1, to such a high level that the coolant may be used to heat the interior of the passenger compartment 25, the blower 21 of the air conditioning device 18 is actuated to discharge the warm air into the passenger compartment 25. The warm air thus heats the interior of the passenger compartment 25. When heating is performed in this manner and the temperature (the inside temperature) in the passenger compartment 25 rises to the set temperature set through the temperature setting switch 29, the power supply to the seat heater 19 is stopped and heat generation by the seat heater 19 is thus suspended. That is, by selectively stopping and operating the blower 21 according to the air conditioner automatic mode and selectively permitting and prohibiting the power supply to the seat heater 19 according to the seat heater automatic mode, heat is provided to occupants in response to the request for heating without unnecessary actuation of the blower 21 or unnecessary heat generation by the seat heater 19.

As has been described, in a recent automobile, thermal efficiency of the engine 1 is enhanced by reducing the size of the engine 1 and performing automatic stopping and restarting, thus decreasing the heat generated by the engine 1. As a result, additional components must be heated when at a cold temperature, aside from the passenger compartment. These components include, for example, the catalytic converter 48 mounted in the exhaust passage 47 of the engine 1. The catalytic converter 48 purifies the exhaust gas with maximum effectiveness when the catalyst is completely warmed up by raising the catalyst bed temperature to the activation level. However, in the aforementioned automobile with less heat generation by the engine 1, the temperature of the exhaust gas of the engine 1 tends to be low. Accordingly, at certain outside air temperatures and in certain operating states of the engine 1, it may be impossible to increase the catalyst bed temperature to a value higher than or equal to the activation level, or, in other words, completely warm up the catalyst.

In the above-described automobile, the heat generated by the engine 1 is distributed preferentially to the passenger compartment 25 by actuating the blower 21. However, the heat of the engine 1 cannot be distributed preferentially to a component (in this example, the catalyst) of the automobile that must be heated when at a low temperature, aside from the passenger compartment 25. Specifically, when a request for heating is generated and the heat generated by the engine 1 increases the coolant temperature TW to such a high level that the coolant may be used to heat the interior of the passenger compartment 25, the blower 21 of the air conditioning device 18 is activated to direct the air heated by the engine 1 as the heat source into the passenger compartment 25. In other words, the heat produced by the engine 1 is distributed preferentially to the passenger compartment 25 by means of the coolant in the circulation path 6 and the aforementioned air. This makes it difficult to supply the heat generated by the engine 1 to the component of the automobile aside from the passenger compartment that must be heated when at a low temperature, which is the catalyst.

If, in the above-described automobile, the heat produced by the engine 1 is prevented from being distributed preferentially to the component aside from the passenger compartment 25 that must be heated when at a low temperature (for example, in the period immediately after cold starting of the engine 1), the catalyst bed temperature remains lower than the activation level, thus prolonging the time needed for completing the warm-up of the catalyst. This retards the timing at which the warm-up of the catalyst is completed and the effectiveness of purifying the exhaust gas is maximized in the period immediately after initiation of starting of the engine 1. As a result, improvement of the exhaust emission of the engine 1 is hampered by the amount corresponding to such retardation.

Solutions by the first embodiment to the above-described problem that occurs in the above-described automobile in the period immediately after initiation of starting of the engine 1 will now be described with reference to FIG. 3.

FIG. 3 is a flowchart representing a heating control routine for providing heat to occupants and heating the passenger compartment 25, which is performed in a period from when starting of the engine 1 is initiated to when the warm-up of the catalyst is completed and a period after completion of the warm-up of the catalyst. The heating control routine is carried out periodically by the air conditioner ECU 27, for example, through time interruption by a predetermined time.

In accordance with the routine, it is first determined whether the current time falls in the period from when starting of the engine 1 has been initiated to when the warm-up of the catalyst is completed (S101).

Specifically, it is determined that the catalyst warm-up has been completed after starting of the engine 1 is initiated when the catalyst bed temperature has risen to the activation level after initiation of starting of the engine 1. The catalyst bed temperature after the catalyst warm-up is completed is estimated with reference to the temperature of the exhaust gas at the position downstream from the catalytic converter 48, which is detected by the exhaust temperature sensor 60. However, it is difficult to estimate the catalyst bed temperature with reference to the aforementioned exhaust temperature in the period from when starting of the engine 1 is initiated to when the warm-up of the catalyst is completed. The catalyst bed temperature in the period from initiation of starting of the engine 1 to completion of the catalyst warm-up is varied greatly depending on the catalyst bed temperature at the time point at which starting of the engine 1 is initiated and the exhaust temperature after initiation of starting of the engine 1. Specifically, the catalyst bed temperature at the time point at which starting of the engine 1 is initiated becomes higher as the time in which the engine 1 has been maintained in a stopped state before initiation of starting of the engine 1 becomes shorter and as the time in which the catalytic converter 48 radiates heat becomes shorter. The catalyst bed temperature in the period from the initiation of starting of the engine 1 to completion of the catalyst warm-up is influenced by the catalyst bed temperature at the time point at which starting of the engine 1 is initiated and the total flow amount of the exhaust gas, the accumulated value of the temperature of the exhaust gas, and the total amount of non-combusted fuel components sent to the catalytic converter 48 after the initiation of starting of the engine 1.

With the above-described facts taken into consideration, the catalyst bed temperature in the period from the initiation of starting of the engine 1 to completion of the catalyst warm-up is estimated by, for example, steps [1] and [2] described below.

[1] If the catalyst warm-up is completed at the time point at which previous stopping of the engine 1 is completed, the catalyst bed temperature estimated from the exhaust temperature at that time point is memorized. Using the memorized catalyst bed temperature and the time in which the engine 1 is maintained in a stopped state before initiation of the current starting of the engine 1, the initial value Tf, which is used to estimate the catalyst bed temperature in the period from the initiation of the current starting of the engine to completion of the catalyst warm-up, is set. The initial value Tf, which is set in the above-described manner, is set to a higher value as the memorized catalyst bed temperature becomes higher and the aforementioned time in which the engine 1 is maintained in the stopped state becomes shorter, so that the initial value Tf becomes a value corresponding to the catalyst bed temperature at the time point at which the current starting of the engine 1 is initiated. If the catalyst warm-up is incomplete at the time point at which the previous stopping of the engine 1 is completed, a fixed value that is determined in advance as an optimal value through tests or the like is used as the above-described initial value Tf.

[2] After the initiation of starting of the engine 1, the temperature increase amount $\Delta T$ of the catalyst bed temperature in a predetermined time interval, such as every 16 ms, is accumulated at every one of the time intervals. The accumulated value $\Sigma\Delta T$ obtained from accumulation is added to the initial value Tf. The added value "$Tf+\Sigma\Delta T$" is defined as the catalyst bed temperature in the period from the initiation of starting of the engine 1 to completion of the catalyst warm-up. In this manner, in the period from when starting of the engine 1 is initiated to when the catalyst warm-up is complete, the catalyst bed temperature is estimated at every one of the aforementioned predetermined time intervals. Specifically, the temperature increase amount $\Delta T$ of the catalyst bed temperature in each of the predetermined time intervals is calculated based on the intake air amount of the engine 1 (which corresponds to the amount of the exhaust gas), the exhaust temperature, and the air-fuel ratio at the time point at which the predetermined time interval elapses. The temperature increase amount $\Delta T$ becomes greater as the intake air amount becomes greater, the exhaust temperature becomes higher, and the air-fuel ratio becomes richer. In other words, as the intake air amount becomes greater, the amount of the exhaust gas passing through the catalytic converter 48 becomes greater and the amount of the heat transmitted from the exhaust gas to the catalytic converter 48 becomes greater. Further, as the exhaust temperature becomes higher, the amount of the heat transmitted from the exhaust gas to the catalytic converter 48 becomes greater. Also, as the air-fuel ratio becomes richer, the amount of the non-combusted fuel components in the exhaust gas sent to the catalytic converter 48 becomes greater and the amount of the heat generated through oxidization of the non-combusted fuel components on the catalyst becomes greater. Accordingly, the catalyst bed temperature estimated using the initial value Tf and the accumulated value $\rho\Delta T$ is a value that is properly estimated according to the total flow amount of the exhaust gas, the accumulated value of the temperature of the exhaust gas, and the total amount of the non-combusted fuel components sent to the catalytic converter 48 after the initiation of starting of the engine 1.

If the catalyst bed temperature estimated in the above-described manner is less than the activation level, it is determined, in step S101, that the current time is in the period from the initiation of starting of the engine 1 to completion of the catalyst warm-up. Activation the blower 21 of the air conditioning device 18 is prohibited (S102). As a result, once the engine 1 is started, actuation of the blower 21 is prohibited unless the catalyst is completely warmed up, even if a request for heating is generated. When the actuation of the blower 21 is prohibited, the air flowing in the air duct 22 through such actuation is prevented from exchanging heat with the coolant at the heater core 24, on the circulation path 6. Accordingly, after the heat produced by the engine 1 is supplied to the coolant, the heat is prevented from being supplied into the passenger compartment 25 by means of the air. The temperature of the engine 1 and the temperature of the coolant thus rapidly rise. This increases the exhaust temperature, thus ensuring efficient heat supply to the catalyst by means of the exhaust gas of the engine 1. In other words, the heat produced by the engine 1 is distributed preferentially to the catalyst, which is a component of the automobile aside from the passenger compartment 25 that must be heated when at a low temperature. Accordingly, after starting of the engine 1 is initiated, the catalyst bed temperature quickly rises to the activation level, thus completing the catalyst warm-up. This prevents retarded completion of the catalyst warm-up after the initiation of starting of the engine 1. As a result, improvement of the exhaust emission is prevented from being hampered by the amount corresponding to the retardation.

After starting of the engine 1 is initiated and the catalyst warm-up is completed, it is determined whether the air conditioner automatic mode is selected (S103). If negative determination is made in step S103, indicating that the air conditioner manual mode is selected, the blower air blow amount is adjusted to the set air blow amount, which is commanded by an occupant through manipulation of the air blow amount setting switch 30, and the open degree (the open/close position) of each air mix damper 26 is regulated to a value corresponding to the set temperature, which is commanded by an occupant through manipulation of the temperature setting switch 29 (S104). In contrast, if it is determined that the air conditioner automatic mode is selected in step S103, a procedure for completing warm-up of the engine 1 at an early stage after the initiation of starting of the engine 1 is carried out (S105 and subsequent steps).

In the series of procedure, the open degree of each air mix damper 26 is regulated according to the target air blow temperature TAO (S105). Then, the engine warm-up determination value TW1, which is used to determine whether the engine 1 is completely warmed up with reference to the coolant temperature TW, is changed to a variable value. Also, a variable engine warm-up determination value/seat heater control procedure is performed as a procedure for controlling the seat heater 19 (S106).

It is then determined whether the coolant temperature TW is less than the engine warm-up determination value TW1 (S107). If a positive determination is made in step S107, actuation of the blower 21 is prohibited (S102). Accordingly, after starting of the engine 1 is initiated and the catalyst warm-up is completed, the blower 21 is prohibited from being activated also if the air conditioner automatic mode is selected and the coolant temperature TA is less than the engine warm-up determination value TW1, or, in other words, if the coolant temperature TW is less than the engine warm-up completion temperature at which it can be determined that the engine 1 is completely warmed up.

In the variable engine warm-up determination value/seat heater control procedure in step S106, the seat heater 19 is caused to produce heat if a request for heating is generated and if not, heat generation by the seat heater 19 is suspended. That is, if a request for heating is produced when the determination in step 107 is positive and the blower 21 is prohibited from being actuated, the seat heater 19 generates heat to warm the occupants and the interior of the passenger compartment 25. This prevents the occupants from feeling cold while activation of the blower 21 is prohibited. That is, the comfort level in the passenger compartment 25 is not lowered.

In contrast, if it is determined that the coolant temperature TW is greater than or equal to the engine warm-up determination value TW1 in step S107, it is indicated that the coolant temperature TW is determined to be greater than or equal to the engine warm-up completion temperature at which it can be determined that warm-up of the engine 1 is complete. In other words, preferential supply of the heat of the engine 1 to the catalyst and the coolant is completed and the heat of the coolant can be used to heat the interior of the passenger compartment 25. In this case, the actuation of the blower 21 is permitted (S108), thus allowing the blower 21 to discharge warm air into the passenger compartment 25 and heat the interior of the passenger compartment 25. When the interior of the passenger compartment 25 is heated by the warm air sent into the passenger compartment 25 through the activation of the blower 21, the blower air blow amount is varied according to the coolant temperature TW, as represented in, for example, FIG. 4. Specifically, the blower air blow amount is set to a greater value as the increase of the coolant temperature TW with respect to the engine warm-up determination value TW1 becomes greater.

FIG. 5 is a flowchart representing a variable engine warm-up determination value/seat heater control routine for carrying out the variable engine warm-up determination value/seat heater control procedure in step S106 of the heating control routine represented in FIG. 3. The variable engine warm-up determination value/seat heater control routine is performed by the air conditioner ECU 27 every time step S106 (FIG. 3) of the heating control routine is carried out.

In the variable engine warm-up determination value/seat heater control routine represented in FIG. 5, it is first determined whether the seat heater automatic mode is selected (S201). When negative determination is made in step S201 and the seat heater manual mode is selected, the seat heater 19 is controlled to the state commanded by an occupant through manipulation of the seat heater automatic control switch 31. Specifically, when the seat heater automatic control switch 31 is at the "ON" position, the power is supplied to the seat heater 19 to cause the seat heater 19 to generate heat. If the seat heater automatic control switch 31 is at the "OFF" position, the power supply to the seat heater 19 is suspended to stop heat generation by the seat heater 19 (S202). The engine warm-up determination value TW1 is then set to the value "A" (S209). As the value "A", the value corresponding to the lower limit of the coolant temperature TW at which the heat generated by the coolant can be used to heat the interior of the passenger compartment 25 is used.

In contrast, if it is determined that the seat heater automatic mode is selected in step S201, a procedure for selectively permitting and prohibiting the power supply to the seat heater 19 in response to a request for heating (S203 to S205) is performed. Specifically, it is determined whether the target air blow temperature TAO is greater than or equal to a predetermined heating request determination value (S203). In other words, it is determined whether a request for heating has been generated. If determination in step S203 is negative, it is determined that the request for heating is not produced and the heat generation by the seat heater 19 is suspended (S205) and the engine warm-up determination value TW1 is set to the aforementioned value "A" (S509).

In contrast, if the determination in step S203 is positive, it is determined that a request for heating is generated and the seat heater 19 is caused to generate heat (S204). Afterwards, a procedure for setting the engine warm-up determination value TW1 to a value higher than the aforementioned value "A" (S206 to S208) is performed.

In the series of procedures, it is first determined whether the economy mode is selected (S207). If negative determination is made in step S206, the engine warm-up determination value TW1 is set to the value "A+β", which is greater than the aforementioned value "A" (S208). If the determination in step S206 is positive, the engine warm-up determination value TW1 is set to the value "A+β+γ", which is greater than the value "A+β" (S207). If the engine warm-up determination value TW1 is increased, step S108 (FIG. 3) of the heating control routine, in which actuation of the blower 21 is permitted (from a prohibited state), is not carried out unless the coolant temperature TW rises. Influences on change of the coolant temperature TW, change of the blower air blow amount, and change of the temperature in the passenger compartment 25 by the increased engine warm-up determination value TW1 will hereafter be described with reference to FIG. 6.

Figure 6:
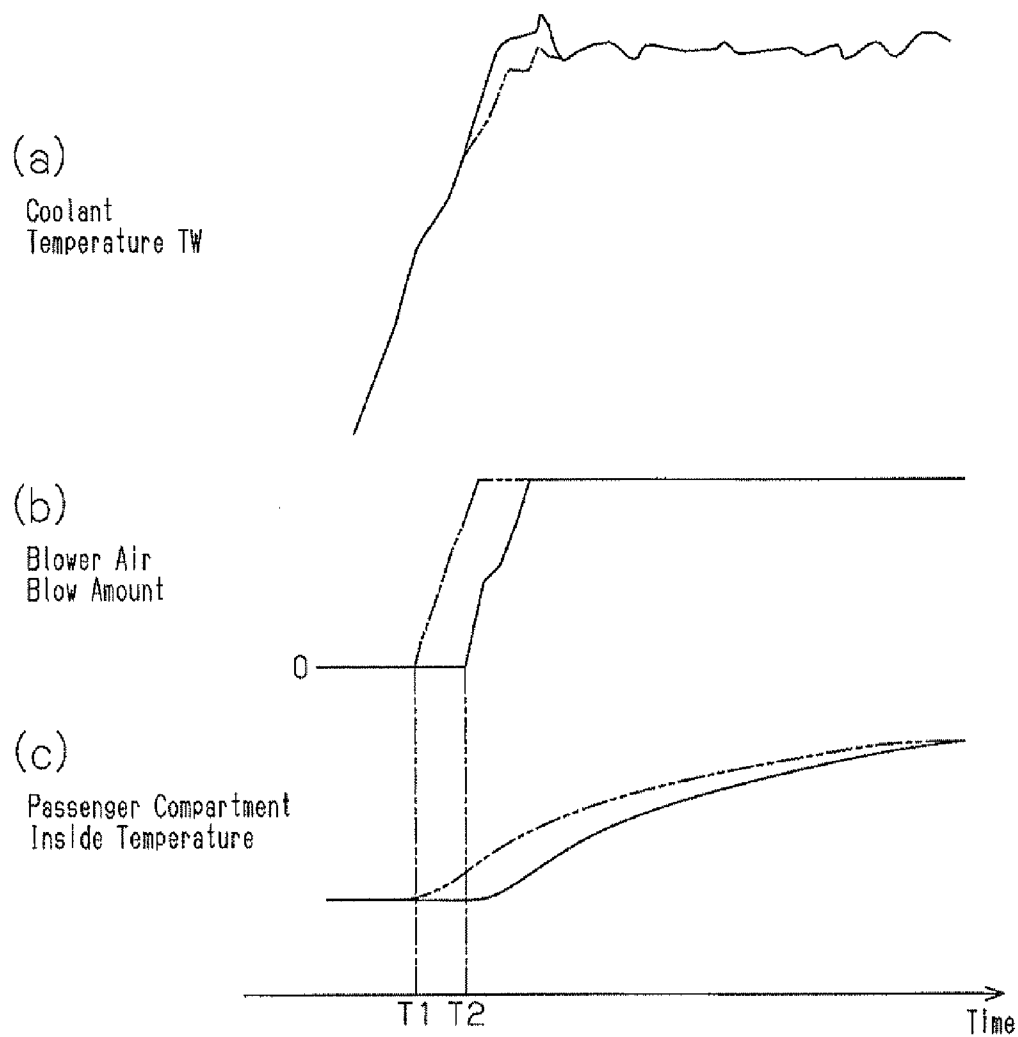
FIG. 6 is a timing chart representing influences of increase of the engine warm-up determination value on changes of the coolant temperature, the blower air blow amount, and the temperature in the passenger compartment.

When the engine warm-up determination value TW1 is increased, the coolant temperature TW becomes greater than or equal to the engine warm-up determination value TW1, thus retarding the timing at which activation of the blower 21 is permitted (from a prohibited state). Accordingly, the timing at which the air blow amount of the blower 21 rises from "0" is retarded, for example, from the time point "T1" to "T2" as represented in FIG. 6(*b*). Retardation of the timing at which the air blow amount of the blower 21 increases from "0" after starting of the engine 1 is initiated indicates preferential supply of the heat produced by the engine 1 to the coolant over the passenger compartment 25. As a result, after initiation of starting of the engine 1, change of the coolant temperature TW is altered from the curve represented by the lines formed by a long dash alternating with two short dashes in FIG. 6(*a*) to the curve represented by the solid lines in the drawing. That is, the coolant temperature TW increases rapidly and the engine 1 is warmed up quickly. Accordingly, as the engine warm-up determination value TW1 becomes greater from the value "A" to the value "A+β" and then to the value "A+β+γ", as has been described, the degree of preference in the supply of the heat produced by the engine 1 to the coolant over the passenger compartment 25 becomes higher. This rapidly raises the coolant temperature TW and quickly warms up the engine 1.

However, when the timing at which the air blow amount of the blower 21 rises from "0" is retarded by increasing the engine warm-up determination value TW1 in such a manner as to supply the heat produced by the engine 1 preferentially to the coolant over the passenger compartment 25, increase of the temperature in the passenger compartment 25 brought about by rise of the blower air blow amount is also retarded. As a result, change of the temperature in the passenger compartment 25 is altered, for example, from the curve represented by the lines formed by a long dash alternating with two short dashes in FIG. 6(*c*) to the curve represented by the solid lines in the drawing. However, even though the increase of the temperature in the passenger compartment 25 is retarded in this manner, the seat heater 19 generates heat to warm the occupants when a request for heating is generated. This prevents the occupants from feeling cold. That is, the comfort level in the passenger compartment 25 is not lowered.

The first embodiment, which has been described in detail, has the advantages described below.

(1) Actuation of the blower 21 of the air conditioning device 18 is prohibited in the period from initiation of starting of the engine 1 to completion of the catalyst warm-up. The blower 21 is thus prevented from being activated even if a request for heating is generated. As long as the actuation of the blower 21 is prohibited, the air flowing in the air duct 22 through activation of the blower 21 is prevented from exchanging heat with the coolant at the heater core 24, which is provided in the circulation path 6. This prevents the heat produced by the engine 1 from being sent into the passenger compartment 25 by means of air after having been supplied to the coolant. The temperature of the engine 1 and the temperature of the coolant thus rapidly increase. This raises the exhaust temperature of the engine 1, thus ensuring efficient heat supply to the catalyst by means of the exhaust gas of the engine 1. In other words, the heat produced by the engine 1 is distributed preferentially to the catalyst, which is a component of the automobile aside from the passenger compartment 25 that must be heated when at a low temperature, by means of the exhaust gas. This quickly increases the catalyst bed temperature to the activation level to complete warm-up of the catalyst after the initiation of starting of the engine 1. As a result, after the initiation of starting of the engine 1, completion of the catalyst warm-up is prevented from being retarded. Improvement of the exhaust emission of the engine 1 is thus prevented from being hampered by the amount corresponding to the retardation.

(2) After starting of the engine 1 is initiated and the catalyst warm-up is completed, the blower 21 is prohibited from being activated also when the air conditioner automatic mode is selected and the coolant temperature TW is less than the engine warm-up determination value TW1, or, in other words, it is determined that the coolant temperature TW is less than the engine warm-up completion temperature at which it can be determined that the warm-up of the engine 1 is complete. When the blower 21 is prohibited from being actuated, the heat generated by the engine 1 is distributed preferentially to not only the catalyst but also the coolant. This completes warm-up of the engine 1 at an early stage after starting of the engine 1 is initiated. If a request for heating is generated when the blower 21 is prohibited from being activated after completion of the catalyst warm-up, heat is provided to the occupants through heat generation by the seat heater 19. This prevents the occupants in the passenger compartment 25 from feeling cold when the blower 21 is prohibited from being activated. That is, the comfort level in the passenger compartment 25 is not lowered. When the coolant temperature TW1 becomes greater than or equal to the engine warm-up determination value TW1, it is determined that the coolant temperature TW is greater than or equal to the engine warm-up completion temperature at which it can be determined that the engine 1 is completely warmed up. In other words, the preferential supply of the heat of the engine 1 to the catalyst and the coolant is completed and the heat of the coolant can be used to heat the interior of the passenger compartment 25. In this state, the blower 21 is permitted to be actuated and the interior of the passenger compartment 25 is heated by the warm air sent into the passenger compartment 25 through actuation of the blower 21. As has been described, the engine 1 is warmed up at an early stage and the comfort level in the passenger compartment 25 is prevented from being lowered.

(3) Whether a request for heating is generated when actuation of the blower 21 is prohibited after the catalyst is completely warmed up is determined by referring to the target air blow temperature TAO, which is used in the air conditioner automatic mode. Specifically, it is determined that the request for heating is generated when the target air blow temperature TAO is greater than or equal to the heating request determination value. When the target air blow temperature TAO is greater than or equal to the heating request determination value, it is determined that the request for heating is not generated. In this manner, it is properly determined whether the request for heating is generated. This prevents the seat heater 19, heat generation of which is selectively permitted and prohibited depending on whether the request for heating is generated, from generating heat unnecessarily or failing to generate heat when necessary in disadvantageous manners.

(4) As to the engine warm-up determination value TW1 in the seat heater automatic mode after completion of the catalyst warm-up, the values ("A+β" or "A+β+γ") at which the seat heater 19 is caused to generate heat in response to determination that a request for heating is generated are higher than the value "A" at which it is determined that the request for heating is not generated and heat generation by the seat heater 19 is suspended. Accordingly, in the seat heater automatic mode, when the seat heater 19 is caused to generate heat in response to the request for heating, actuation of the blower 21 is permitted from a prohibited state only after the coolant temperature TW increases to a high value after starting of the engine 1 is initiated, compared with when negative determination is made as to whether the request for heating is generated and the heat generation by the seat heater 19 is suspended. In other words, after initiation of starting of the engine 1, the heat generated by the engine 1 is supplied further preferentially to the coolant over the passenger compartment 25. This further rapidly raises the coolant temperature TW and further quickly warms up the engine 1, after the initiation of starting of the engine 1. Also, even when the heat produced by the engine 1 is supplied further preferentially to the coolant over the passenger compartment 25, the seat heater 19 is caused to generate heat to warm the occupants. This prevents the occupants from feeling cold. That is, the comfort level in the passenger compartment 25 is not lowered.

(5) If the economy mode is selected by an occupant when the seat heater automatic mode is selected and the seat heater 19 is caused to generate heat in response to a request for heating, the engine warm-up determination value TW1 is set to the value "A+β+γ", which is higher than the value "A+β" for when the normal mode is selected. Accordingly, in the economy mode, after initiation of starting of the engine 1, actuation of the blower 21 is permitted from a prohibited state only after the coolant temperature TW increases to a high value, compared with when the normal mode is selected. In other words, after the initiation of starting of the engine 1, the heat generated by the engine 1 is supplied further preferentially to the coolant over the passenger compartment 25. This further rapidly raises the coolant temperature TW and further quickly warms up the engine 1, after starting of the engine 1 is initiated.

Second Embodiment

A second embodiment of the present invention will hereafter be described with reference to FIG. 7.

In the automobile in which thermal efficiency of the engine 1 is improved by reducing the size of the engine 1 or ensuring automatic stopping and restarting, transmission oil used by the transmission 10 may be considered as a component aside from the passenger compartment 25 that must be heated when at a low temperature.

The transmission 10 achieves such an operating state that the transmission 10 contributes to reduction in fuel consumption of the engine 1 when the temperature of the transmission oil increases to a value (which is, for example, a determination value H1) that is high to a certain extent compared with the normal value at the time when the engine 1 is held in a stopped state. Accordingly, to decrease the fuel consumed by the engine 1, the flow control valve 6*b* of the branch line 6*a* communicating with the circulation path 6 of the heat exchanging device 17 may be opened. This causes heat exchange in the oil cooler 16 in the oil passage 15 between the transmission oil and the coolant flowing in the circulation path G. The transmission oil is thus heated by the coolant and maintained at a value greater than or equal to the determination value H1. However, in the above-described automobile with less heat generation by the engine 1, the temperature of the coolant, which is heated through heat exchange with the engine 1, tends to be low. As a result, at certain outside air temperatures and in certain operating states, it may be impossible for the coolant to increase the temperature of the transmission oil to a value greater than or equal to the determination value H1.

In the second embodiment, the heat generated by the engine 1 is distributed preferentially to the transmission oil, which is a component of the above-described automobile aside from the passenger compartment 25 that must be heated when at a low temperature (in, for example, a period immediately after cold starting of the engine 1). This rapidly raises the temperature of the transmission oil to a value greater than or equal to the determination value H1. The timing at which the temperature of the transmission oil increases to a value greater than or equal to the determination value H1 in the period immediately after initiated starting of the engine is thus prevented from being retarded. As a result, reduction of the fuel consumed by the engine 1 is prevented from being hampered by the amount corresponding to such retardation.

Specifically, a state in which execution of lock-up control is permitted, for example, may be cited as an operating state of the transmission 10 that contributes to the reduction in fuel consumption of the engine 1. In accordance with the lock-up control, the lock-up clutch 11 is caused to connect the transmission mechanism to the engine 1. When the transmission mechanism is connected to the engine 1 by the lock-up clutch 11 through the lock-up control, rotation of the engine 1 is efficiently transmitted to the transmission mechanism. This decreases the fuel consumed by the engine 1 when the engine 1 is operated to cause the vehicle to travel. The execution of the lock-up control is permitted when the temperature of the transmission oil increases from the normal value at the time when the engine 1 is in a stopped state to a lock-up control permitting temperature. As a result, if the state in which the lock-up control is permitted in the transmission 10 is defined as the operating state of the transmission 10 contributing to decrease of the fuel consumption of the engine 1, the aforementioned determination value H1 is set to the lock-up control permitting temperature.

Also, a state in which execution of neutral control is permitted may be cited as an operating state of the transmission 10 that contributes to the decrease of the fuel consumed by the engine 1. In accordance with the neutral control, the transmission mechanism is forcibly switched to a neutral state when a request for automobile traveling is not generated. It is determined that the request for automobile traveling is not generated on condition, for example, that the vehicle speed is "0" and the accelerator depression amount is "0" or that the vehicle speed is "0" and the brake of the automobile is activated. As the transmission mechanism is forcibly switched to the neutral state through the neutral control, the resistance of the transmission 10 to the rotation of the engine 1 is reduced. The fuel consumption of the engine 1 is thus decreased by the amount corresponding to the reduced resistance. The execution of the neutral control is permitted when the temperature of the transmission oil rises from the normal value at the time when the engine 1 is in a stopped state to a neutral control permitting temperature. As a result, if the state in which the execution of the neutral control is permitted in the transmission 10 is defined as the state of the transmission 10 contributing to the reduced consumption of the fuel by the engine 1, the aforementioned determination value H1 is set to the neutral control permitting temperature.

FIG. 7 is a flowchart representing a heating control routine of the second embodiment. This heating control routine is different from the heating control routine of the first embodiment only in the procedure (S301) corresponding to the procedure in step S101 (FIG. 3) of the heating control routine of the first embodiment. Accordingly, the description below focuses on the components of the second embodiment that are different from the corresponding components of the routine of the first embodiment and the components related to the different components.

In the procedure of step S301 of the heating control routine of the second embodiment, it is determined whether the current time falls in the period from when starting of the engine 1 is initiated to when the temperature of the transmission oil rises to the aforementioned determination value H1. If the temperature of the transmission oil is less than the determination value H1, a positive determination is made in step S301 and actuation of the blower 21 of the air conditioning device 18 is prohibited (S302).

Accordingly, after the engine 1 is started, the actuation of the blower 21 is prohibited until the temperature of the transmission oil increases to a value greater than or equal to the aforementioned determination value H1, even if a request for heating is generated. As long as the blower 21 is prohibited from being activated, heat exchange between the air flowing in the air duct 22, which is brought about through the actuation of the blower 21, and the coolant at the heater core 24 on the circulation path 6 is prevented from occurring. Accordingly, the heat produced by the engine 1 is prevented from being supplied into the passenger compartment 25 by means of the aforementioned air after having been supplied to the coolant. This quickly raises the temperature of the engine 1 and the temperature of the coolant. As a result, the heat is efficiently provided to the transmission oil in the oil cooler 16 by means of the coolant. In other words, the heat generated by the engine 1 is distributed preferentially to the transmission oil, which is a component of the automobile aside from the passenger compartment 25 that must be heated when at a low temperature, by means of the coolant. This rapidly increases the temperature of the transmission oil to the aforementioned determination value H1, and the transmission 10 achieves the operating state that contributes to reduction of the fuel consumed by the engine 1. The transmission 10 is thus prevented from being retarded in achieving the aforementioned operating state after initiation of starting of the engine 1. As a result, reduction of the fuel consumption of the engine 1 is maintained without being hampered by the amount corresponding to such retardation.

The second embodiment has the advantages described below.

(6) After starting of the engine 1 is initiated, the temperature of the transmission oil quickly increases to the aforementioned determination value H1, thus allowing the transmission 10 to achieve the operating state that contributes to the reduction in fuel consumption by the engine 1. This prevents the transmission 10 from being retarded in achieving the operating state. As a result, the decreased consumption of fuel by the engine 1 is maintained without being hampered by the amount corresponding to such retardation.

(7) If the state in which execution of the lock-up control is permitted in the transmission 10 is defined as an operating state of the transmission 10 that contributes to decrease of the fuel consumed by the engine 1, the aforementioned determination value H1 is set to the lock-up control permitting temperature. In this case, after initiation of starting of the engine 1, the temperature of the transmission oil rapidly rises to the lock-up control permitting temperature. This causes the transmission 10 to achieve, without retardation, the state in which the execution of the lock-up control is permitted. Reduction of the fuel consumed by the engine 1 is thus prevented from being hampered by the amount corresponding to such retardation.

(8) If the state in which execution of the neutral control is permitted in the transmission 10 is defined as an operating state of the transmission 10 that contributes to reduction of the fuel consumed by the engine 1, the aforementioned value H1 is set to the neutral control permitting temperature. In this case, after initiation of starting of the engine 1, the temperature of the transmission oil quickly rises to the neutral control permitting temperature, and the transmission 10 achieves, without retardation, the state in which the execution of the neutral control is permitted. As a result, the reduction of the fuel consumption of the engine 1 is prevented from being hampered by the amount corresponding to such retardation.

(9) The second embodiment obtains the advantages equivalent to the advantages (2) to (5) of the first embodiment.

Third Embodiment

A third embodiment of the present invention will hereafter be described with reference to FIG. 8.

In an automobile in which thermal efficiency of the engine 1 is enhanced by reducing the size of the engine 1 or performing automatic stopping and restarting, the lubricant oil used by the engine 1 may also be cited as a component aside from the passenger compartment 25 that must be heated when at a low temperature.

In the engine 1, the viscosity of the lubricant oil decreases when the temperature of the lubricant oil increases to a value (which is, for example, a determination value H2) that is high to a certain extent compared with the normal value at the time when the engine 1 is in a stopped state. This reduces the resistance of the lubricant oil to the rotation of the engine 1, thus allowing the engine 1 to operate efficiently. The engine 1 is thus allowed to operate in a state effective for decrease of the fuel consumption by the engine 1. Accordingly, to reduce the fuel consumed by the engine 1, heat exchange may be caused between the coolant in the circulation path 6 and the lubricant oil to maintain the temperature of the lubricant oil as a value greater than or equal to the aforementioned determination value H2. However, in the above-described automobile with less heat generation by the engine 1, the temperature of the coolant, which is heated through heat exchange with the engine 1, tends to be low. Accordingly, at certain outside air temperatures and in certain operating states of the engine 1, it may be impossible to maintain the temperature of the lubricant oil of the engine 1 at a value greater than or equal to the determination value H2.

In the third embodiment, the heat generated by the engine 1 is distributed preferentially to the lubricant oil of the engine 1, which is a component of the above-described automobile aside from the passenger compartment 25 that must be heated when at a low temperature (in, for example, a period immediately after cold starting of the engine 1). This rapidly raises the temperature of the lubricant oil to a value greater than or equal to the determination value H2. The timing at which the temperature of the lubricant oil increases to a value greater than or equal to the determination value H2 in the period immediately after initiation of starting of the engine is thus prevented from being retarded. As a result, reduction of the fuel consumed by the engine 1 is prevented from being hampered by the amount corresponding to such retardation.

FIG. 8 is a flowchart representing a heating control routine of the third embodiment. This heating control routine is different from the heating control routine of the first embodiment only in the procedure (S401) corresponding to the procedure in step S101 (FIG. 3) of the heating control routine of the first embodiment. Accordingly, the description below focuses on the components of the third embodiment that are different from the corresponding components of the routine of the first embodiment and the components related to the different components.

In the procedure of step S401 of the heating control routine of the third embodiment, it is determined whether the current time falls in the period from when starting of the engine 1 is initiated to when the temperature of the lubricant oil rises to the aforementioned determination value H2. If the temperature of the lubricant oil is less than the determination value H2, a positive determination is made in step S401 and actuation of the blower 21 of the air conditioning device 18 is prohibited (S402).

Accordingly, after the engine 1 is started, the actuation of the blower 21 is prohibited until the temperature of the lubricant oil increases to a value greater than or equal to the aforementioned determination value H2, even if a request for heating is generated. As long as the blower 21 is prohibited from being activated, heat exchange between the air flowing in the air duct 22, which is brought about through the actuation of the blower 21, and the coolant at the heater core 24 on the circulation path 6 is prevented from occurring. Accordingly, the heat produced by the engine 1 is prevented from being supplied into the passenger compartment 25 by means of the aforementioned air after having been supplied to the coolant. This quickly raises the temperature of the engine 1 and the temperature of the coolant. As a result, the heat is efficiently transmitted to the lubricant oil of the engine 1 by means of the coolant. In other words, the heat generated by the engine 1 is distributed preferentially to the lubricant oil, which is a component of the automobile aside from the passenger compartment 25 that must be heated when at a low temperature, by means of the coolant. This rapidly increases the temperature of the lubricant oil to the aforementioned determination value H2. That is, the engine 1 is prevented from being retarded in achieving the operating state in which the engine 1 is efficiently driven. As a result, reduction of the fuel consumption of the engine 1 is maintained without being hampered by the amount corresponding to such retardation.

The third embodiment has the advantages described below.

(10) After initiation of starting of the engine 1, the temperature of the lubricant oil quickly rises to the aforementioned determination value H2, thus allowing the engine 1 to achieve the state in which the engine 1 is efficiently driven. This prevents the engine 1 from being retarded in achieving such a state, and decrease of the fuel consumed by the engine 1 is maintained without being hampered by the amount corresponding to such retardation.

(11) The third embodiment has the advantages equivalent to the advantages (2) to (5) of the first embodiment.

Fourth Embodiment

A fourth embodiment of the present invention will hereafter be described with reference to FIGS. 9 to 12.

The fourth embodiment is a modification of the first embodiment and different from the first embodiment in a procedure performed after starting of the engine 1 is initiated and warm-up of the catalyst is completed. Specifically, if the blower 21 is activated to discharge air into the passenger compartment 25 in response to a request for heating after completion of the warm-up of the catalyst, the air is heated through heat exchange with the coolant at the heater core 24. In this state, the temperature of the coolant may drop to a value less than the lower limit at which the air is capable of heating the interior of the passenger compartment 25.

Specifically, in the automobile with the thermal efficiency of the engine 1 improved by reducing the size of the engine 1 and performing automatic stopping and restarting, the heat generated by the engine 1 decreases. Accordingly, the temperature of the coolant, which is heated through heat exchange with the engine 1, tends to be low. Particularly, when EGR control is carried out in a maximally broad engine operating range in order to reduce the fuel consumed by the engine 1, the tendency that the temperature of the coolant is lowered becomes further pronounced. Specifically, when the EGR control is performed, the EGR valve 52 is opened and some of the exhaust gas of the engine 1 is returned to the intake passage 42 via the EGR passage 51. At this stage, pumping loss and cooling loss of the engine 1 are reduced. Although the reduced pumping loss or cooling loss of the engine 1 decreases the fuel consumed by the engine 1, the decreased cooling loss of the engine 1 corresponds to reduced generation of heat by the engine 1. Execution of the EGR control thus lowers the coolant temperature TW. As a result, when the EGR control is carried out and the blower 21 is activated, the tendency for the coolant temperature TW to drop to a value less than the aforementioned lower limit becomes further pronounced.

In the fourth embodiment, a temperature raising control for raising the coolant temperature TW by performing engine operation that increases the heat generated by the engine 1 is performed if the coolant temperature TW drops to a value less than the aforementioned lower limit after the blower 21 is actuated to discharge warm air into the passenger compartment 25 in response to a request for heating. Specifically, the temperature raising control involves increasing the idle speed of the engine 1, prohibiting automatic stopping of the engine 1, and restarting the engine 1 when in an automatically stopped state. Since these operations increase the heat generated by the engine 1, the coolant temperature TW restores a value greater than or equal to the lower limit. However, the increased heat generation of the engine 1 through the temperature raising control increases the fuel consumed by the engine 1, which is disadvantageous in reducing the fuel consumption of the engine 1. Accordingly, in order to decrease the fuel consumed by the engine 1, it is preferable to maximally avoid the above-described temperature raising control.

Considering the above-described fact, after starting of the engine 1 is initiated and the catalyst warm-up is completed in the fourth embodiment, a temperature drop preventing control is performed to prevent the coolant temperature TW from dropping if it is determined that the coolant temperature TW is such a low value that the coolant temperature TW is likely to drop to a value less than the lower limit due to actuation of the blower 21 in response to the request for heating. In this case, through such temperature drop preventing control, the coolant temperature TW is prevented from dropping to a value less than the lower limit. This prevents the above-described temperature raising control from being carried out due to the dropped coolant temperature TW. As a result, decrease of the fuel consumed by the engine 1 is maximally prevented from being hampered by the temperature raising control.

In FIG. 9(*a*), the solid curve represents change of the coolant temperature TW with the temperature drop preventing control. The curve formed by a long dash alternating with two short dashes represents change of the coolant temperature TW without the temperature drop preventing control. As is clear from the graph, in the case without the temperature drop preventing control (as represented by the formed by a long dash alternating with two short dashes), the coolant temperature TW is not prevented from dropping to a value less than the aforementioned lower limit. In this case, in accordance with the temperature raising control, the engine 1 is prohibited from automatically stopping or restarted when in an automatically stopped state. As a result, the automatic stopping and restarting of the engine 1 is suspended and the engine speed changes as represented in FIG. 9(*c*). This inevitably hampers reduction of the fuel consumption of the engine 1 brought about by the automatic stopping and restarting of the engine 1. In contrast, in the case with the temperature drop preventing control (as represented by the solid curve), the coolant temperature TW is prevented from dropping to a value less than the lower limit. This maximally prevents the temperature raising control, which involves prohibition of the automatic stopping of the engine 1 and restarting of the engine 1 when in an automatically stopped state, from being carried out. As a result, the automatic stopping and restarting of the engine 1 is normally performed and the engine speed changes as represented in FIG. 9(*b*). This prevents the reduction of the fuel consumption of the engine 1, which is ensured by the automatic stopping and restarting of the engine 1, from being hampered.

Figure 10:
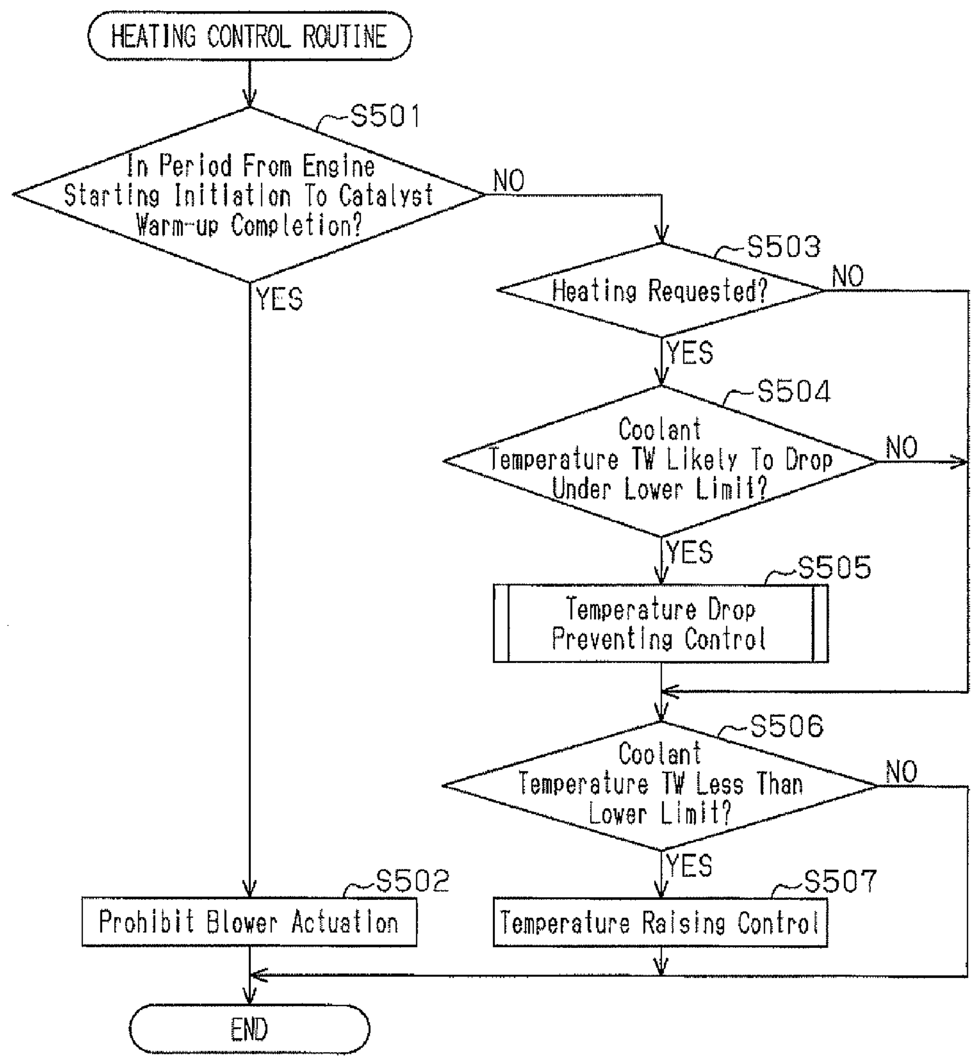
FIG. 10 is a flowchart representing steps of heating control according to a fourth embodiment.

FIG. 10 is a flowchart representing a heating control routine of the fourth embodiment. The heating control routine is also performed by the air conditioner ECU 27 periodically by, for example, time interruption at predetermined time intervals.

In the heating control routine, it is determined whether the current time falls in the period from when starting of the engine 1 is initiated to when the catalyst warm-up is completed (S501). If a positive determination is made in step S501, the blower 21 is prohibited from being actuated (S501). In contrast, if starting of the engine 1 has been initiated and the catalyst has been completely warmed up (S501: NO), a procedure (S503 to S505) for carrying out the above-described temperature drop preventing control and a procedure (S506 and S507) for performing the above-described temperature raising control are carried out.

In the procedure (S503 to S505) for performing the temperature drop preventing control, it is first determined whether a request for heating is generated (S503), or, in other words, the blower 21 has been activated. If a positive determination is made in step S503, it is determined whether the coolant temperature TW is such a low temperature that the coolant temperature TW is likely to drop to a value less than the aforementioned lower limit due to actuation of the blower 21 (S504). If the coolant temperature TW is so low that it is likely that the coolant temperature TW drops to a value less than the lower limit through the actuation of the blower 21, the above-described temperature drop preventing control is carried out (S505).

In the procedure (S506 and S507) for performing the temperature raising control, it is determined whether the coolant temperature TW is less than the aforementioned lower limit (S506). If determination of step S506 is positive, the above-described temperature raising control is carried out (S507).

FIG. 11 is a flowchart representing a temperature drop preventing control routine for performing the temperature drop preventing control in step S505 of the heating control routine represented in FIG. 10. The temperature drop preventing control routine is performed by the air conditioner ECU 27 each time step S505 (FIG. 10) of the heating control routine is carried out.

In the temperature drop preventing control routine, the air blow amount of the blower 21 is decreased in accordance with the temperature drop preventing control (S602), on condition that the air conditioner automatic mode is selected (S601: YES). This decreases the amount of the air discharged into the passenger compartment 25 via the heater core 24 in the circulation path 6. The heat of the coolant that is transmitted to the air in the heater core 24 is thus decreased and a temperature drop in the coolant is prevented. However, the heat transmitted from the coolant to the air at the time when the air passes by the heater core 24 is reduced, thus inevitably lowering the temperature of the air discharged into the passenger compartment 25. Accordingly, occupants may feel cold. That is, the comfort level in the passenger compartment 25 can be lowered. To solve this problem, when the air blow amount of the blower 21 is decreased by the temperature drop preventing control, the seat heater 19 is caused to generate heat (S603). Specifically, heat generation by the seat heater 19 is performed in such a manner that the amount of the generated heat is increased by a predetermined amount compared with the heat generation amount of the seat heater 19 in a heat generation suspended state or a prescribed heat generating state. In this manner, the heat of the seat heater 19 warms the occupants and the interior of the passenger compartment 25. As a result, the occupants are prevented from feeling cold. That is, the comfort level in the passenger compartment 25 is not lowered.

Subsequently, it is determined whether a sufficient level of thermal comfort is provided to the occupants by the heat generated by the seat heater 19 (S604). The thermal comfort for the occupants is influenced by the temperature in the passenger compartment 25 (the inside temperature). Determination in step S604 may thus be carried out with reference to the inside temperature. Specifically, when the inside temperature is such a value that the heat generated by the seat heater 19 can provide a sufficient level of thermal comfort to the occupants, a positive determination is made in step S604. Otherwise, the determination in step S604 is negative. If the determination in step S604 is positive and on condition that the time necessary for the decreased air blow amount of the blower 21 to change the coolant temperature TW has elapsed (S605: YES), it is determined whether the coolant temperature TW is such a low value that the coolant temperature TW is likely to drop to a value less than the aforementioned lower limit (S606). If a positive determination is made in step S606, it is indicated that decrease of the coolant temperature TW to a value less than the lower limit cannot be prevented simply by the reduced air blow amount of the blower 21. In this case, in accordance with the temperature drop preventing control, execution of the EGR control is performed (S607) in addition to reduction of the air blow amount of the blower 21. Step S607 is performed to prohibit the EGR control from being carried out also when negative determination is made in step S601 or step S604. By prohibiting the execution of the EGR control, the coolant temperature TW is further reliably prevented from being lowered to a value less than the lower limit. As a result, the fuel consumed by the engine 1 is prevented further reliably from being increased by performing the temperature raising control.

In contrast, when negative determination is made in step S606, it is indicated that the decrease of the coolant temperature TW to a value less than the lower limit is prevented simply by the reduction of the air blow amount of the blower 21. In this case, the flag F is set to "1" (S608) and the execution of the EGR control is permitted (S609). In other words, the execution of the EGR control is prevented from being prohibited. When the flag F is "1", it is indicated that the air blow amount of the blower 21 is decreased in accordance with the temperature drop preventing control with the execution of the EGR control permitted. When the flag F is "0", it is indicated otherwise. Step S609 is carried out to permit the execution of the EGR control also when determination in step S605 is negative.

Figure 12:
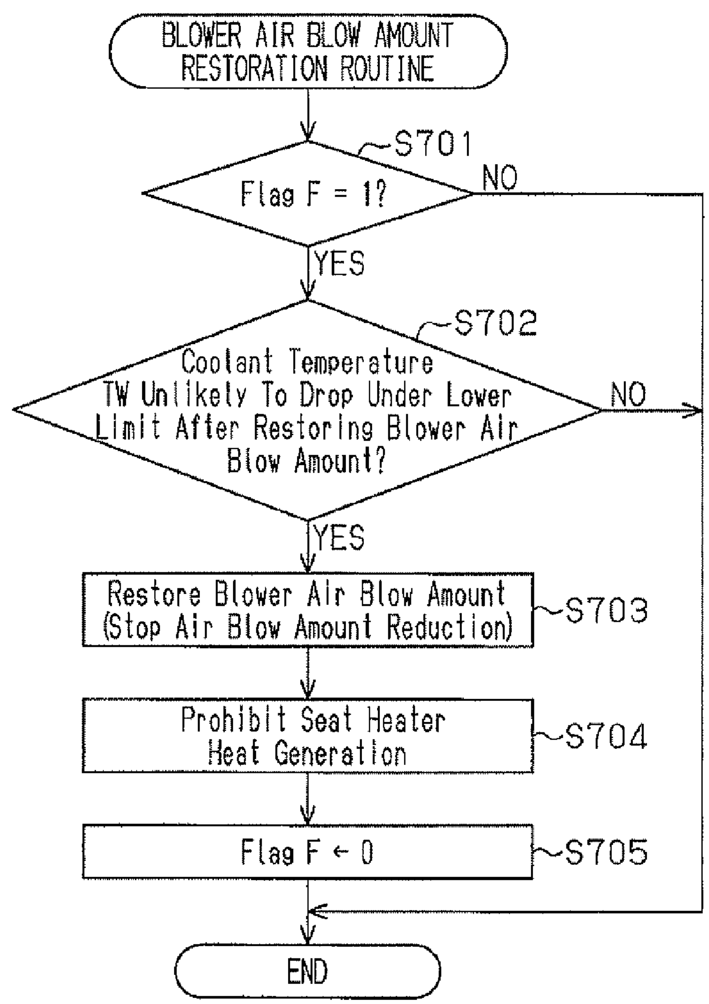
FIG. 12 is a flowchart representing steps for restoration from a reduced blower air blow amount.

FIG. 12 is a flowchart representing a blower air blow amount restoration routine for restoring the air blow amount of the blower 21 by suspending the reduction of the air blow amount of the blower 21 that is performed in accordance with the temperature drop preventing control when the execution of the EGR control is permitted. The blower air blow amount restoration routine is carried out by the air conditioner ECU 27 periodically through time interruption at, for example, predetermined time intervals.

The blower air blow amount restoration routine involves determination whether the flag F is "1" (S701) and determination whether the coolant temperature TW is such a high value that the coolant temperature TW is unlikely to decrease to a value less than the aforementioned lower limit even if the air blow amount of the blower 21 is restored to the original value before the reduction (S702). Specifically, for determination in step S702, a rising amount of the coolant temperature TW caused by restoring the air blow amount of the blower 21 to the original value is defined as "ΔT" and the lower limit is defined as "TC". It is then determined whether the coolant temperature TW is high to a certain extent compared with the sum "TC+ΔT". When a positive determination is made in both step S701 and step S702, the reduction of the air blow amount of the blower 21 is suspended and the air blow amount is restored to the original value (S703). The heat generation by the seat heater 19 is then stopped (S704). Afterwards, the flag F is reset to "0" (S705).

The fourth embodiment has the advantages described below in addition to the advantage (1) of the first embodiment.

(12) After starting of the engine 1 is initiated and the catalyst is completely warmed up, the temperature drop preventing control is carried out to prevent the coolant temperature TW from dropping if it is determined that the coolant temperature TW is so low that the coolant temperature TW is likely to decrease to a value less than the aforementioned lower limit through actuation of the blower 21 in response to a request for heating. The temperature drop preventing control prevents the coolant temperature TW from dropping to a value less than the lower limit, thus preventing the temperature raising control from being performed due to such drop of the coolant temperature TW. As a result, reduction of the fuel consumed by the engine 1 is maximally prevented from being hampered through execution of the temperature raising control.

(13) Reduction of the air blow amount of the blower 21 in accordance with the temperature drop preventing control decreases the amount of the air flowing into the passenger compartment 25 via the heater core 24 in the circulation path 6. This decreases the heat of the coolant that is transmitted to the aforementioned air in the heater core 24. The coolant temperature TW is thus prevented from dropping to a value less than the aforementioned lower limit. However, the reduced air blow amount of the blower 21 decreases the amount of the heat transmitted from the coolant to the air passing by the heater core 24. This inevitably lowers the temperature of the air sent into the passenger compartment 25. This can cause occupants to feel cold. That is, the comfort level in the passenger compartment 25 may be lowered. To solve the problem, the seat heater 19 is caused to generate heat when the air blow amount of the blower 21 is reduced as has been described. In this case, the heat of the seat heater 19 warms the occupants, thus preventing the occupants from feeling cold. That is, the comfort level in the passenger compartment 25 is not lowered.

(14) In accordance with the temperature drop preventing control, the air blow amount of the blower 21 is decreased first. Then, on condition that the coolant temperature TW cannot be prevented from dropping to a value less than the lower limit simply by the reduced air blow amount of the blower 21, execution of the EGR control is prohibited. This reliably prevents drop of the coolant temperature TW to a value less than the lower limit. Increase of the fuel consumed by the engine 1 is thus further reliably prevented from being caused through execution of the temperature raising control. Contrastingly, if the coolant temperature TW is prevented from decreasing to a value less than the lower limit simply by reducing the air blow amount of the blower 21, the execution of the EGR control is prevented from being prohibited but permitted. This maximally allows the execution of the EGR control, thus ensuring a maximum effect in reduction of the fuel consumed by the engine 1 through the EGR control.

(15) When the air blow amount of the blower 21 is reduced with execution of the EGR control permitted and the coolant temperature TW rises to such a high value that the coolant temperature TW is unlikely to drop to a value less than the lower limit even if reduction of the air blow amount of the blower 21 is suspended and the air blow amount is restored to the original amount, the reduction of the air blow amount of the blower 21 is suspended to restore the original air blow amount and heat generation by the seat heater 19 is stopped. This prevents the reduction of the air blow amount of the blower 21 and the heat generation by the seat heater 19 from continuing for an unnecessarily long time.

Fifth Embodiment

A fifth embodiment of the present invention will hereafter be described with reference to FIG. 13.

The fifth embodiment is a modification of the second embodiment and different from the second embodiment in a procedure after starting of the engine 1 is initiated and the temperature of the transmission oil increases to a value greater than or equal to the aforementioned determination value H1. This procedure of the fifth embodiment is the same as the procedure after completion of the catalyst warm-up of the fourth embodiment.

Figure 13:
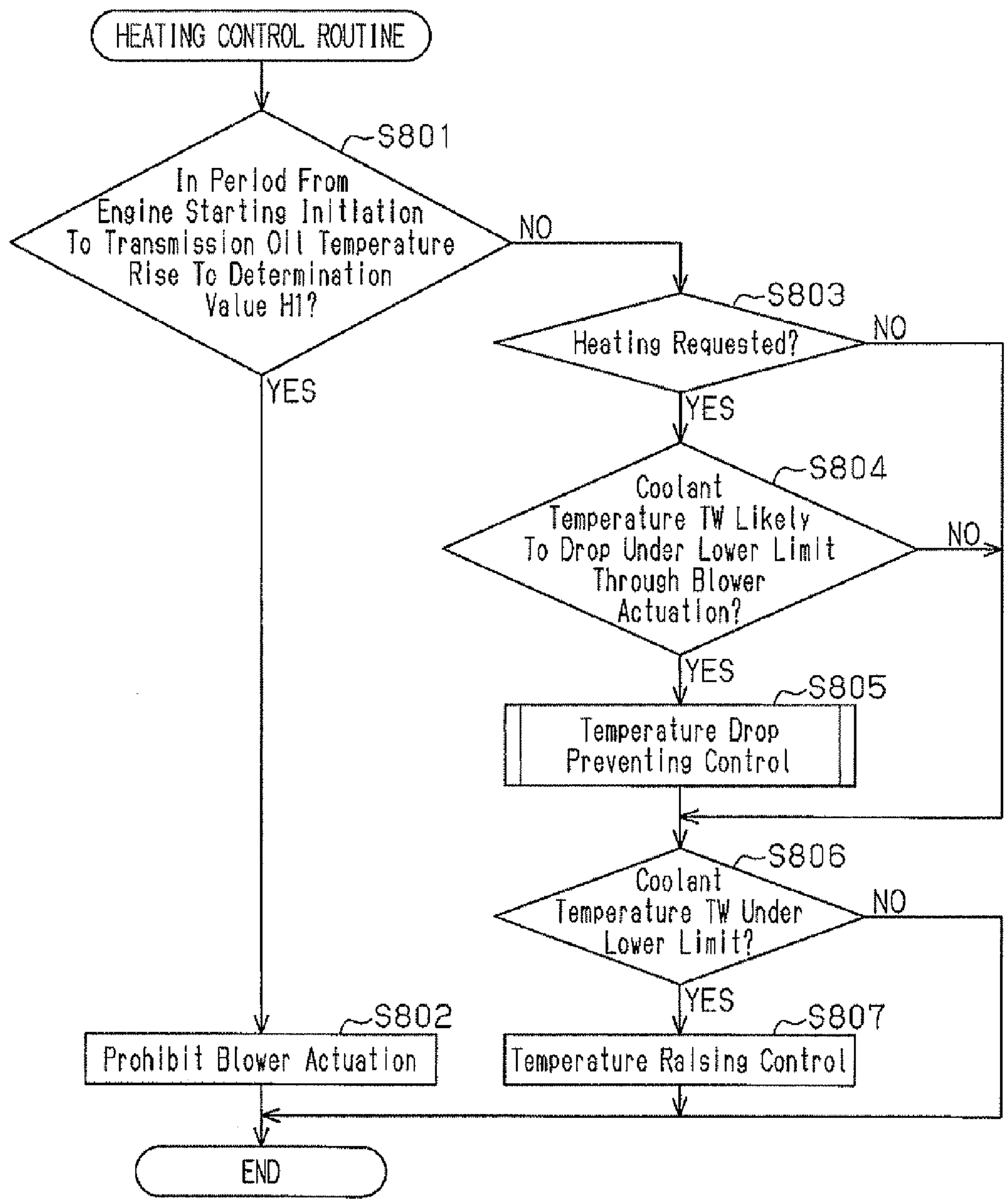
FIG. 13 is a flowchart representing steps of heating control according to a fifth embodiment.

FIG. 13 is a flowchart representing a heating control routine of the fifth embodiment. In the heating control routine, it is determined whether the current time falls in the period from when starting of the engine 1 is initiated to when the temperature of the transmission oil rises to the determination value H1 (S801). If a positive determination is made in step S801, actuation of the blower 21 is prohibited (S802). In contrast, when determination in step S801 is negative, a procedure of step S803 to step S807 is performed. The procedure is the same as the procedure of step S503 to S507 of the heating control routine (FIG. 9) of the fourth embodiment.

The fifth embodiment has the advantage equivalent to the advantage (6) of the second embodiment and the advantages equivalent to the advantages (12) to (15) of the fourth embodiment.

Sixth Embodiment

A sixth embodiment of the present invention will now be described with reference to FIG. 14.

The sixth embodiment is a modification of the third embodiment and different from the third embodiment in a procedure after starting of the engine 1 is initiated and the temperature of the lubricant oil of the engine 1 increases to a value greater than or equal to the aforementioned determination value H2. This procedure is the same as the procedure after completion of the catalyst warm-up of the fourth embodiment.

Figure 14:
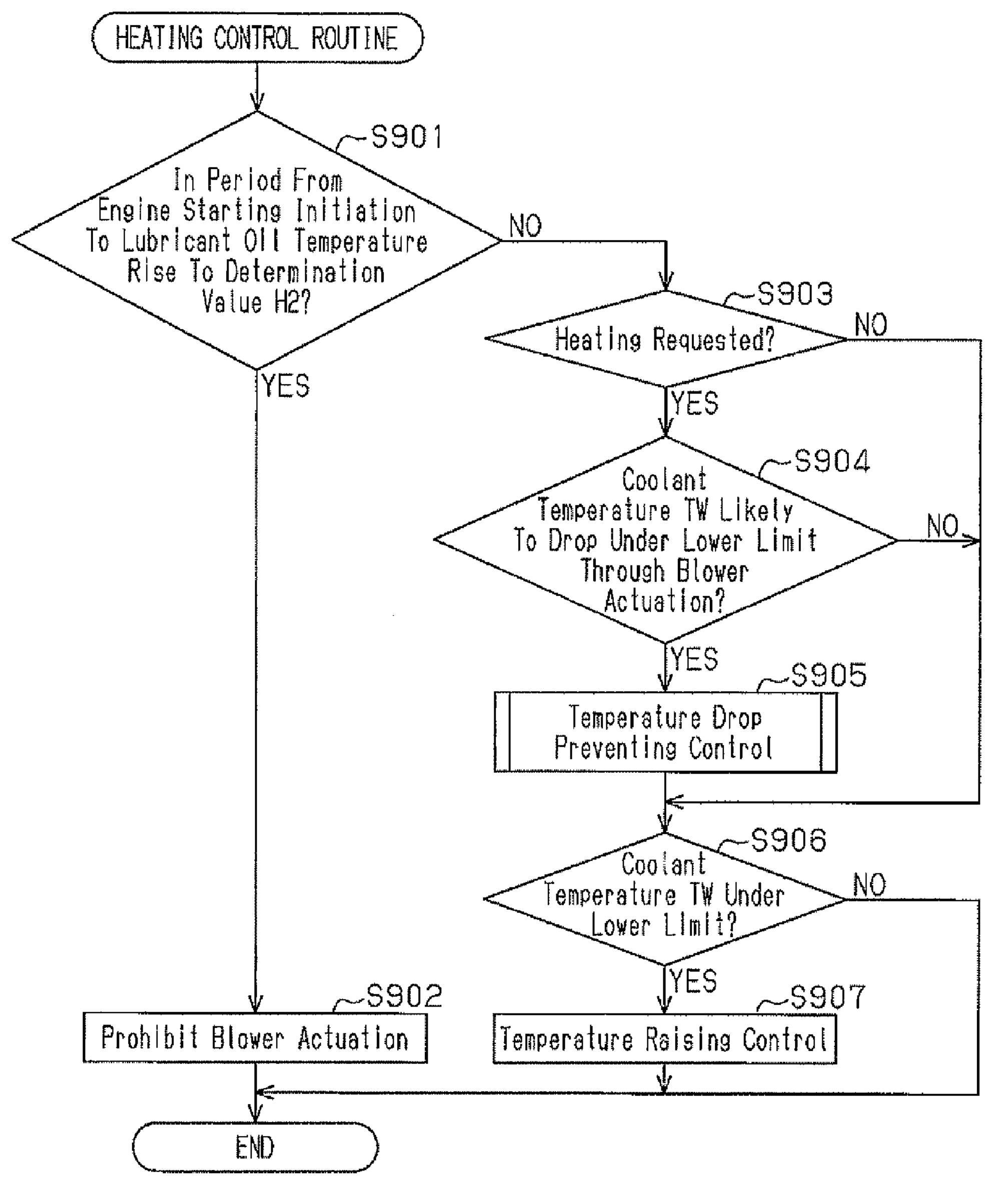
FIG. 14 is a flowchart representing steps of heating control according to a sixth embodiment.

FIG. 14 is a flowchart representing a heating control routine of the sixth embodiment. In the heating control routine, it is determined whether the current time falls in the period from when starting of the engine 1 is initiated to when the temperature of the lubricant oil of the engine 1 rises to the determination value H2 (S901). If a positive determination is made in step S901, actuation of the blower 21 is prohibited (S902). In contrast, when determination in step S901 is negative, a procedure of step S903 to step S907 is performed. The procedure is the same as the procedure of step S503 to S507 of the heating control routine (FIG. 9) of the fourth embodiment.

The sixth embodiment has the advantage equivalent to the advantage (10) of the third embodiment and the advantages equivalent to the advantages (12) to (15) of the fourth embodiment.

Other Embodiments

The illustrated embodiments may be modified to, for example, the forms described below.

In each of the first to sixth embodiments, an electrothermal type steering wheel heater or an air heater for heating the air flowing in the air duct 22 may be employed as heat generating means (a heat generating portion).

In the first to third embodiments, the engine warm-up determination value TW1 in the normal mode and the engine warm-up determination value TW1 in the economy mode are set to different values. However, the engine warm-up value in both modes may be fixed to, for example, the value "A+β" corresponding to the normal mode.

In the fourth to sixth embodiments, the temperature drop preventing control may include only one of reduction of the blower air blow amount and prohibition of EGR control execution.

In the fourth to sixth embodiments, heat generation by the seat heater 19 does not necessarily have to be performed when the blower air blow amount is reduced in accordance with the temperature drop preventing control.

In the variable engine warm-up determination value/seat heater control procedure of the first to third embodiments, the heat generation by the seat heater 19 does not necessarily have to be carried out when a request for heating is generated.

In the first embodiment, when the determination in step S101 of the heating control routine is positive, the heat generation by the seat heater 19 may be selectively permitted and prohibited depending on whether the request for heating is generated. In the heating control routine, the procedure of step S101 does not necessarily have to be performed but may be omitted.

In the second embodiment, when the determination in step S301 of the heating control routine is positive, the heat generation by the seat heater 19 may be selectively permitted and prohibited depending on whether the request for heating is generated. In the heating control routine, the procedure of step S301 does not necessarily have to be performed but may be omitted.

In the third embodiment, when a positive determination is made in step S401 of the heating control routine, the heat generation by the seat heater 19 may be selectively permitted and prohibited depending on whether the request for heating is generated. In the heating control routine, the procedure of step S401 does not necessarily have to be performed but may be omitted.

In the fourth embodiment, when the determination in step S501 of the heating control routine is positive, the heat generation by the seat heater 19 may be selectively permitted and prohibited depending on whether the request for heating is generated. In the heating control routine, the procedure of step S501 does not necessarily have to be performed but may be omitted.

In the fifth embodiment, when a positive determination is made in step S801 of the heating control routine, the heat generation by the seat heater 19 may be selectively permitted and prohibited depending on whether the request for heating is generated. In the heating control routine, the procedure of step S801 does not necessarily have to be performed but may be omitted.

In the sixth embodiment, when the determination in step S901 of the heating control routine is positive, the heat generation by the seat heater 19 may be selectively permitted and prohibited depending on whether the request for heating is generated. In the heating control routine, the procedure of step S901 does not necessarily have to be performed but may be omitted.

In the second and fifth embodiments, the determination value H1 may be set to such a temperature of the transmission oil that the viscosity of the transmission oil drops and resistance of the transmission 10 (the transmission oil) to rotation of the engine 1 decreases, thus ensuring efficient operation of the engine 1.

The invention claimed is:

1. A vehicular control device comprising:

a catalyst that is arranged in an exhaust system of an internal combustion engine mounted in a vehicle and purifies exhaust gas;

a heat exchanging device including a circulation path passing through the engine, the heat exchanging device circulating heat exchanging fluid in the circulation path to cause heat exchange between the heat exchanging fluid and the engine;

an air conditioning device having a heat exchanger on the circulation path and a blower that is actuated to produce a flow of air passing by the heat exchanger in response to a request for heating, the air conditioning device directing air into a passenger compartment after the air is warmed through the heat exchange with the heat exchanging fluid at the heat exchanger; and a prohibiting section that prohibits actuation of the blower in a period from when starting of the engine is initiated to when the catalyst is warmed up completely, wherein, when the blower is actuated to direct heated air into the passenger compartment in response to a request for heating, temperature raising control for raising a temperature of the heat exchanging fluid by operating the engine to increase an amount of the heat generated by the engine is performed on condition that the temperature of the heat exchanging fluid drops to a value less than a lower limit of the temperatures that allow the air to heat an interior of the passenger compartment, the control device further comprising a control section, wherein, when it is determined that the temperature of the heat exchanging fluid is so low that the temperature of the heat exchanging fluid is likely to decrease to a value less than the lower limit through the actuation of the blower in response to a request for heating after the catalyst is completely warmed up, the control section performs temperature drop preventing control to prevent a temperature drop in the heat exchanging fluid.

2. The vehicular control device according to claim 1, wherein:

the vehicle has a heat generating portion that generates heat to heat the interior of the passenger compartment through a heat source other than the engine; and the control section reduces an air blow amount of the blower in the temperature drop preventing control, and causes the heat generating portion to generate heat when the air blow amount of the blower is decreased.

3. The vehicular control device according to claim 2, wherein:

the engine is capable of carrying out EGR control for returning some of exhaust gas passing through an exhaust system to an intake system through an EGR mechanism;

the control section prohibits execution of the EGR control in addition to reduction of the air blow amount of the blower in the temperature drop preventing control; and the execution of the EGR control is prohibited on condition that decrease of the temperature of the fluid exchanging fluid to a value less than the lower limit cannot be prevented simply by reducing the air blow amount of the blower, and is permitted if the decrease of the temperature of the heat exchanging fluid to a value less than the lower limit is prevented simply by decreasing the air blow amount of the blower.

4. The vehicular control device according to claim 3, wherein:

the control section permits the execution of the EGR control when the decrease of the temperature of the heat exchanging fluid to a value less than the lower limit is prevented simply by reducing the air blow amount of the blower; and when the reduction of the air blow amount of the blower is performed with the EGR control permitted, the control section suspends the reduction of the air blow amount of the blower to restore the air blow amount to an original value and stops heat generation by the heat generating portion if the temperature of the heat exchanging fluid rises to such a value that the temperature of the heat exchanging fluid is prevented from dropping to a value less than the lower limit even after suspension of the reduction of the air blow amount of the blower and restoration of the air blow amount to the original value.

5. A vehicular control device comprising:

a catalyst that is arranged in an exhaust system of an internal combustion engine mounted in a vehicle and purifies exhaust gas;

a heat exchanging device including a circulation path passing through the engine, the heat exchanging device circulating heat exchanging fluid in the circulation path to cause heat exchange between the heat exchanging fluid and the engine;

an air conditioning device having a heat exchanger on the circulation path and a blower that is actuated to produce a flow of air passing by the heat exchanger in response to a request for heating, the air conditioning device directing air into a passenger compartment after the air is warmed through the heat exchange with the heat exchanging fluid at the heat exchanger; and a prohibiting section that prohibits actuation of the blower in a period from when starting of the engine is initiated to when the catalyst is warmed up completely, wherein the vehicle has a heat generating portion that generates heat to heat an interior of the passenger compartment through a heat source other than the engine, wherein the prohibiting section:

continuously prohibits the actuation of the blower if, after completion of warm-up of the catalyst, a temperature of the heat exchanging fluid is less than an engine warm-up completion temperature at which it is determined that the engine is completely warmed up;

causes the heat generating portion to generate heat if a request for heating is generated while the actuation of the blower is prohibited; and permits the actuation of the blower on condition that the warm-up of the catalyst is completed and the temperature of the heat exchanging fluid is greater than or equal to the engine warm-up completion temperature, wherein:

the air conditioning device sets a target air blow temperature, which is a target value for a temperature of the air sent into the passenger compartment through the actuation of the blower based on an outside air temperature, an actual inside temperature in the passenger compartment, and a set temperature for the passenger compartment set by an occupant, the air conditioning device varying a heat exchange amount between the air and the heat exchanging fluid at the heat exchanger based on the target air blow temperature;

the prohibiting section determines that a request for heating is generated when the target air blow temperature is greater than or equal to a predetermined heating request determination value and causes the heat generating portion to generate heat, the prohibiting section determining that the request for heating is not generated if the target air blow temperature is less than the heating request determination value and suspending heat generation by the heat generating portion;

the prohibiting section determines that the temperature of the heat exchanging fluid is greater than or equal to the engine warm-up completion temperature and permits the actuation of the blower on condition that the temperature of the heat exchanging fluid is greater than or equal to an engine warm-up determination value; and the engine warm-up determination value is set to a higher value when the heat generating portion is caused to generate heat on condition that it is determined that the request for heating is generated than when the heat generation by the heat generating portion is suspended on condition that it is determined that the request for heating is not generated.

6. The vehicular control device according to claim 5, wherein:

the air conditioning device is switchable between a normal mode and an economy mode through switch manipulation by an occupant of the vehicle; and the engine warm-up determination value is set variably depending on the switch manipulation between the normal mode and the economy mode, the engine warm-up determination value being set to a higher value when the economy mode is selected than when the normal mode is selected.

* * * * *